(12) United States Patent
Uchida et al.

(10) Patent No.: US 6,301,442 B1
(45) Date of Patent: Oct. 9, 2001

(54) OPTICAL INSTRUMENT AND IMAGE PHOTOGRAPHIC METHOD

(75) Inventors: Mitsuhiro Uchida; Yuji Kume; Yasushi Nozawa, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/515,405

(22) Filed: Feb. 29, 2000

(30) Foreign Application Priority Data

Mar. 30, 1999 (JP) .................................................. 11-089298

(51) Int. Cl.$^7$ ...................................................... G03B 15/03
(52) U.S. Cl. ............................ 396/166; 396/176; 396/225
(58) Field of Search ..................................... 396/166, 225, 396/155, 176; 348/370, 371, 360, 361, 342, 224

(56) References Cited

U.S. PATENT DOCUMENTS 6,215,962 * 4/2001 Cooper ................................. 396/225

* cited by examiner

Primary Examiner—W. B. Perkey
(74) Attorney, Agent, or Firm—Young & Thompson

(57) ABSTRACT

A lens-fitted photo film unit for photographing an object includes a flash charger button as mode selector, which designates a selected one of a flashless mode and a flashing mode. An exposure aperture forms a color image by object light from the object. The image, if the flashless mode is designated, is recorded with first color balance in the exposure aperture, and if the flashing mode is designated, is recorded with second color balance. An electronic flash unit applies flash light to the object. A light balancing filter as color balance adjustor subjects the object light to correction if the flashless mode is designated, so as to set the first and second color balance substantially equal to one another.

19 Claims, 17 Drawing Sheets

ENERGY DISTRIBUTION OF F6 WHITE FLUORESCENT LAMP

●: STANDARD LIGHT SOURCE C

▶: F6 WHITE FLUORESCENT LAMP

◆: TUNGSTEN LIGHT SOURCE A

● : STANDARD LIGHT SOURCE C

▶ : F6 WHITE FLUORESCENT LAMP

◆ : TUNGSTEN LIGHT SOURCE A

● : STANDARD LIGHT SOURCE C

▶ : F6 WHITE FLUORESCENT LAMP

◆ : TUNGSTEN LIGHT SOURCE A

○ : FLASH LIGHT

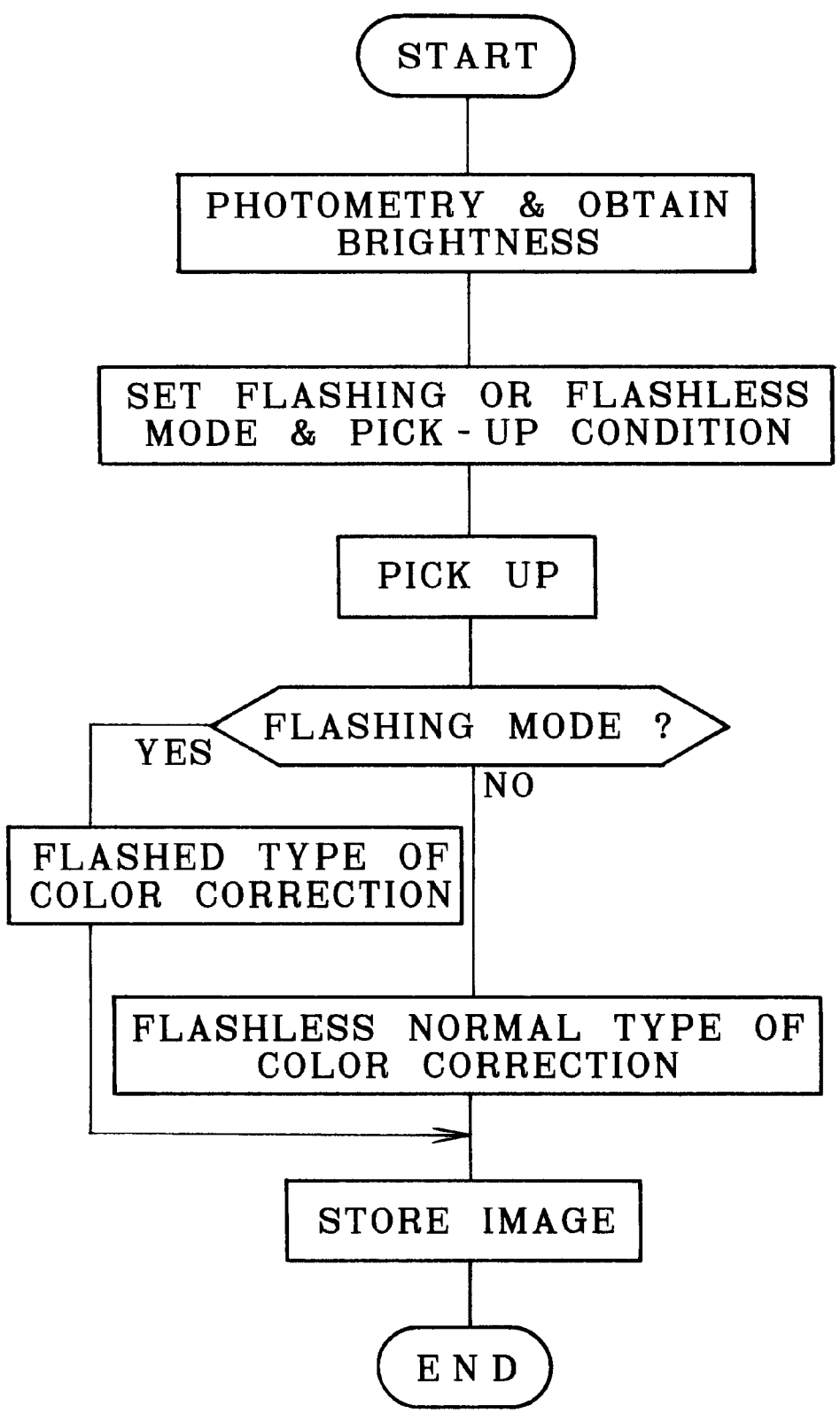

OPTICAL INSTRUMENT AND IMAGE PHOTOGRAPHIC METHOD

BACKGROUND OF THE INVENTION

1. Field of the Invention

The present invention relates to an optical instrument and an image photographing method. More particularly, the present invention relates to an optical instrument and an image photographing method for photographing an object image with appropriate color balance in indoor photography in particular.

2. Description Related to the Prior Art

Optical instruments, such as a photographic camera and a digital still camera, are widely used for photographing an object image. The photographic camera is used with silver halide photo film. The digital still camera incorporates a CCD image sensor. Any of such optical instruments is generally provided with an electronic flash device, which makes it possible to photograph an object indoors with insufficient illumination.

A photographic camera is used with a daylight type of color negative photo film which is the most suitable for outdoor photography under daylight. The flash device incorporated in the camera has color balance (color temperature) of flash light corresponding to color balance of daylight. Recently, there have been color negative photo films having high speed without lowering the image quality. As cameras of types with the flash device have been widely used, users takes indoor photographs the more frequently.

It is likely indoors that the use of flash light creates a high contrast frame in which an image of a principal object is over-exposed and recorded in a whitened manner, and/or an image of a background scene is under-exposed and darkened. To avoid such unwanted exposures, various suggestions have been made, including heightening speed of the photo film, lowering a shutter speed, and lowering the f-number of a photographic optical system. Also the principal object is illuminated with flash light being weakened, and the background scene is illuminated suitably by indoor illumination of an indoor light source.

However it is impossible to obtain a photographic print with sufficiently high color reproduction or color balance. When the principal object is effectively illuminated by flash light, the principal object is photographed on the photo film with coloration or tint near to that of its image which would be photographed while illuminated by daylight. The background scene behind the principal object is not illuminated by flash light, and thus photographed with the coloration of the indoor illumination. In general, the indoor illumination has color different from the daylight color, to cause a problem in the color reproduction. When the principal object is reproduced from the photo film on the photographic print neutrally or with the coloration or chromaticity very near to color of the photographic object, the color of the indoor illumination strongly remains in the background scene. In contrast, when the background scene is reproduced on the photographic print with neutral coloration, the color complementary to that of the indoor illumination strongly remains in the principal object. In any case, color failure occurs.

Let the indoor illumination be light of a tungsten lamp, the photo film of a daylight type be used under the indoor illumination, and the principal object be photographed while illuminated with flash light of the daylight color. When the photographic print is produced, the background scene has deep orange color while the principal object has its neutral coloration on the photographic print. If a printer of a type capable of correcting the colors effectively is used to produce the photographic print, the whole of the frame is finished with the coloration near to the neutral coloration. In such a frame, the background scene only has light orange color. But the cyan color is conspicuously added to the portion of the principal object, the cyan color being complementary to the orange color. An image of a person's face will be finished with very unnatural color reproduction.

If the indoor illumination is light of fluorescent lamps, pale green is added to an image of the background scene of the photographic print. Or the magenta color is conspicuously added to the image of the principal object for example a flesh-color portion of a person, the magenta color being complementary to the green color. A portrait of a person results in very unnatural color reproduction.

In order to prevent such problems, professional photographers selectively use photo films of a daylight type and a tungsten light source type. Also they use selectively lens filters suitable for the types of light sources for the purpose of obtaining optimized color balance. Those methods of indoor photography are well-known in the field of photography, but very difficult for amateur photographers to use. In addition, similar problems occurs with the digital still camera as optical instrument which uses the CCD image sensor instead of the silver halide photo film.

SUMMARY OF THE INVENTION

In view of the foregoing problems, an object of the present invention is to provide an optical instrument and an image photographing method for photographing an object image with acceptable color balance in indoor photography in particular.

In order to achieve the above and other objects and advantages of this invention, an optical instrument for photographing an object comprises an electronic flash unit for applying flash light to the object. An exposure station forms a color image by object light from the object. The optical instrument satisfies a condition of:

$$0 \leq \Delta E \leq 0.08$$

where $\Delta E$ is a light source color difference amount between the flash unit and a white fluorescent lamp of F6 type, and obtained from conditions of:

$$\Delta E = \sqrt{[(X_1-X_2)^2+(Y_1-Y_2)^2]}$$

$$X_1=[(RF-R0)-(GF-G0)]-[(BF-B0)-(GF-G0)]/2$$

$$Y_1=[(BF-B0)-(GF-G0)]\times \sin(\pi/3)$$

$$X_2=[(RS-R0)-(GS-G0)]-[(BS-B0)-(GS-G0)]/2$$

$$Y_2=[(BS-B0)-(GS-G0)]\times \sin(\pi/3)$$

where RF, GF and BF are Status-M converted density of red, green and blue colors of a gray reference reflector plate having a reflectance factor of 18%, the Status-M converted density being obtained by illuminating the gray reflector plate with the white fluorescent lamp of the F6 type, by photographing an image of the gray reflector plate in the exposure station, and by detection of the image.

RS, GS and BS are Status-M converted density of the red, green and blue colors of the gray reflector plate, the Status-M converted density being obtained by illuminating the gray reflector plate with the flash unit, by photographing an image of the gray reflector plate in the exposure station, and by detection of the image.

R0, G0 and B0 are Status-M converted density of the red, green and blue colors of the gray reflector plate, the Status-M converted density being obtained by illuminating the gray reflector plate with a standard light source C, by photographing an image of the gray reflector plate in the exposure station, and by detection of the image.

Preferably, the optical instrument satisfies a condition of:

$$0 \leq \Delta E \leq 0.06.$$

More preferably, the optical instrument satisfies a condition of:

$$0 \leq \Delta E \leq 0.04.$$

Furthermore, a mode selector designates a selected one of first and second predetermined photographing modes, wherein if the first and second photographing modes are designated, the image is recorded with respectively first and second color balance in the exposure station. A color balance adjustor subjects the flash light or the object light to correction if the first photographing mode is designated, to satisfy the condition of:

$$0 \leq \Delta E \leq 0.08$$

so as to set the first and second color balance substantially equal to one another.

By the construction of the present invention, an object image can be photographed with acceptable color balance in indoor photography in particular, because flash light or object light is subjected to correction when the particular one of the two photographing modes is designated.

In a preferred embodiment, the optical instrument satisfies a condition of:

$$40° \leq \theta \leq 90°$$

where $\theta$ is a phase angle depending upon RF, GF, BF, R0, G0 and B0, and defined in an X-Y orthogonal coordinate system between a vector $(X_1, Y_1)$ and a portion of X-axis having a positive sign in a predetermined rotational direction according to a point $(X_1, Y_1)$ plotted in the X-Y orthogonal coordinate system.

The phase angle $\theta$ is a value satisfying conditions of:
if $X_1=0$ and $Y_1=0$, then $\theta=0°$,
if $X_1 \neq 0$, then $\theta \tan^{-1}(Y_1/X_1)$,
if $X_1 \geq 0$, $Y_1 \geq 0$, then $0° \leq \tan^{-1}(Y_1/X_1) \leq 90°$,
if $X_1 \leq 0$, $Y_1 \geq 0$, then $90° \leq \tan^{-1}(Y_1/X_1) \leq 180°$,
if $X_1 \leq 0$, $Y_1 \leq 0$, then $180° \leq \tan^{-1}(Y_1/X_1) \leq 270°$,
if $X_1 \geq 0$, $Y_1 \leq 0$, then $270° \leq \tan^{-1}(Y_1/X_1) \leq 360°$.

In a preferred embodiment, the optical instrument is loadable with an unexposed photo film of a predetermined type, adapted to recording of the image of the object, and having spectral sensitivity satisfying the condition of:

$$40° \leq \theta \leq 90°$$

so as to record a light source color of the white fluorescent lamp of the F6 type in a manner tinted with a yellow, reddish yellow or greenish yellow color in comparison with a light source color of the standard light source C.

In another preferred embodiment, the first and second photographing modes are a flashless mode and a flashing mode, and the mode selector allows the flash unit to operate if the flashing mode is designated.

If the first and second photographing modes are designated, respectively first and second object light advances from the object through a photographing light path toward the exposure station. The color balance adjustor converts the first object light into color-balance-revised object light of which color balance is substantially equal to color balance of the second object light.

The color balance adjustor comprises a light balancing filter, having a predetermined color, disposed movably, and if the first photographing mode is designated, positioned inside the photographing light path, and if the second photographing mode is designated, positioned outside the photographing light path.

The optical instrument is a lens-fitted photo film unit pre-loaded with unexposed photo film, and photo film is set in the exposure station.

The first photographing mode is the flashless mode.

In still another preferred embodiment, the optical instrument is a digital still camera loadable with a recording medium. Furthermore, an image sensor is disposed in the exposure station for outputting image information by detecting object light. The color balance adjustor is an image processor for processing the image information, for correcting the image information if the first photographing mode is designated, and for writing the image information to the recording medium after the processing and correction, wherein the image information after the correction represents object light according to the object light but with a change in color balance.

The first photographing mode is the flashing mode.

The mode selector includes a photometric circuit for measuring object brightness of the object light. A controller compares the object brightness with reference brightness, to designate the flashing mode if the object brightness is equal to or less than the reference brightness, and to designate the flashless mode if the object brightness is more than the reference brightness.

In another preferred embodiment, the optical instrument is a camera, and is loadable with photo film of first and second predetermined types, and the photo film is set in the exposure station and adapted to recording of the image of the object. The mode selector is operated according to which the photo film is of the first and second types, and designates the first and second photographing modes for respectively the first and second types. The color balance adjustor converts the flash light directly emitted by the flash unit into flash light with a change in coloration in accordance with spectral sensitivity of the first and second types and coloration of the flash light, the first and second color balance being set substantially equal irrespective of a difference between the first and second types in the spectral sensitivity.

The color balance adjustor comprises a flash filter, having a predetermined color, disposed movably, and if the first photographing mode is designated, set away from a front of a flash emitter of the flash unit, and if the second photographing mode is designated, set in front of the flash emitter.

BRIEF DESCRIPTION OF THE DRAWINGS

The above objects and advantages of the present invention will become more apparent from the following detailed description when read in connection with the accompanying drawings, in which:

FIG. 17 is a flow chart illustrating operation of the digital still camera.

DETAILED DESCRIPTION OF THE PREFERRED EMBODIMENT(S) OF THE PRESENT INVENTION

There are various types of indoor light sources in the field of illumination. The most widely used types of them are a white flourescent lamp and a tungsten lamp such as incandescent lamp. Recently numerous types of flourescent lamps have been known, for example a daylight type and a three-wavelength type which is provided with improved bulb color and color rendering properties. In consideration of this situation, investigation and experiments were effected. As a result, it has been confirmed that, only if the white flourescent lamp and the tungsten light source are considered, 90% or more of the indoor light sources can be safely used for photography.

Figure 1:
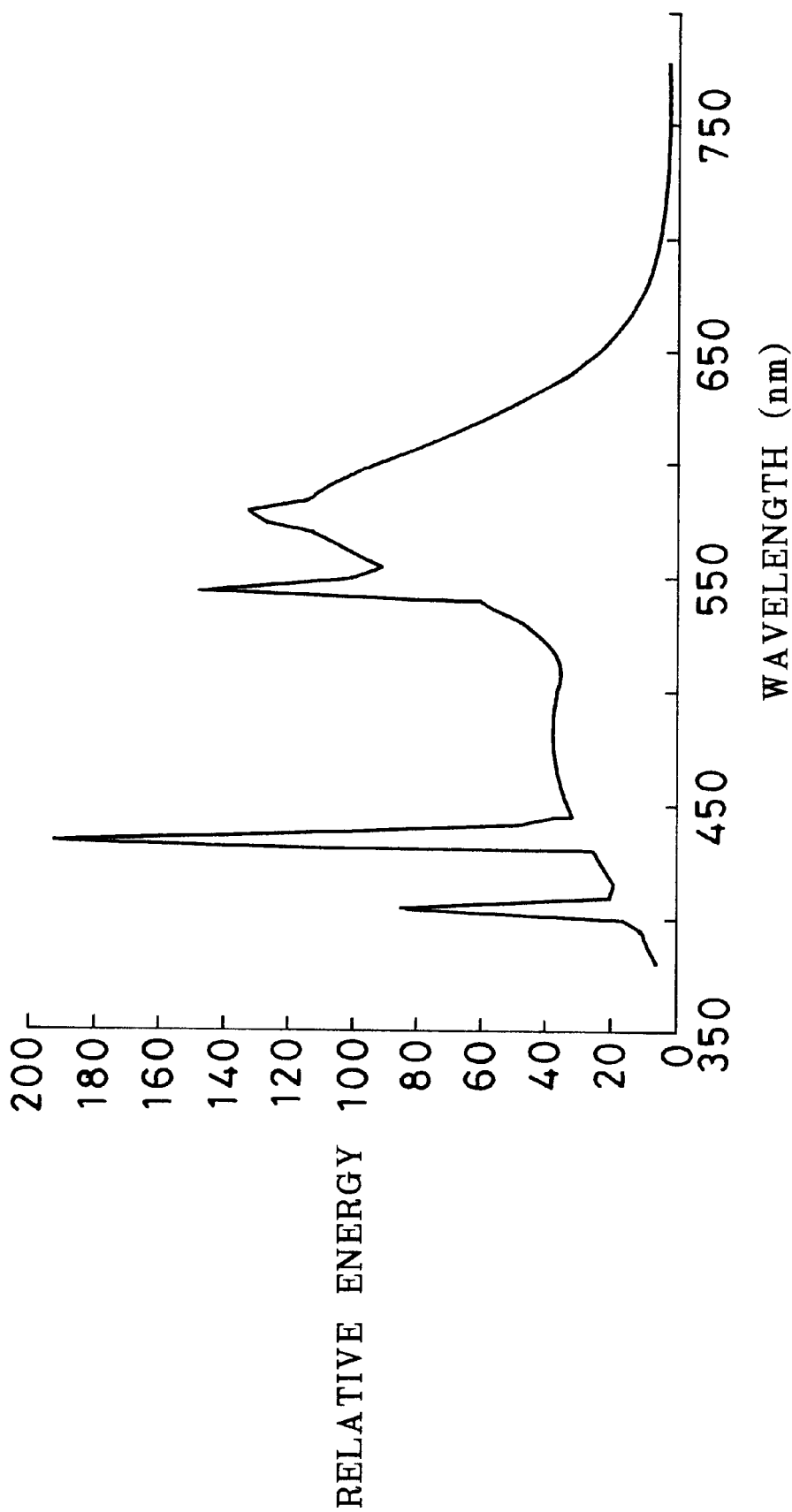
FIG. 1 is a graph illustrating energy distribution of a white fluorescent lamp of the F6 type.
Figure 2:
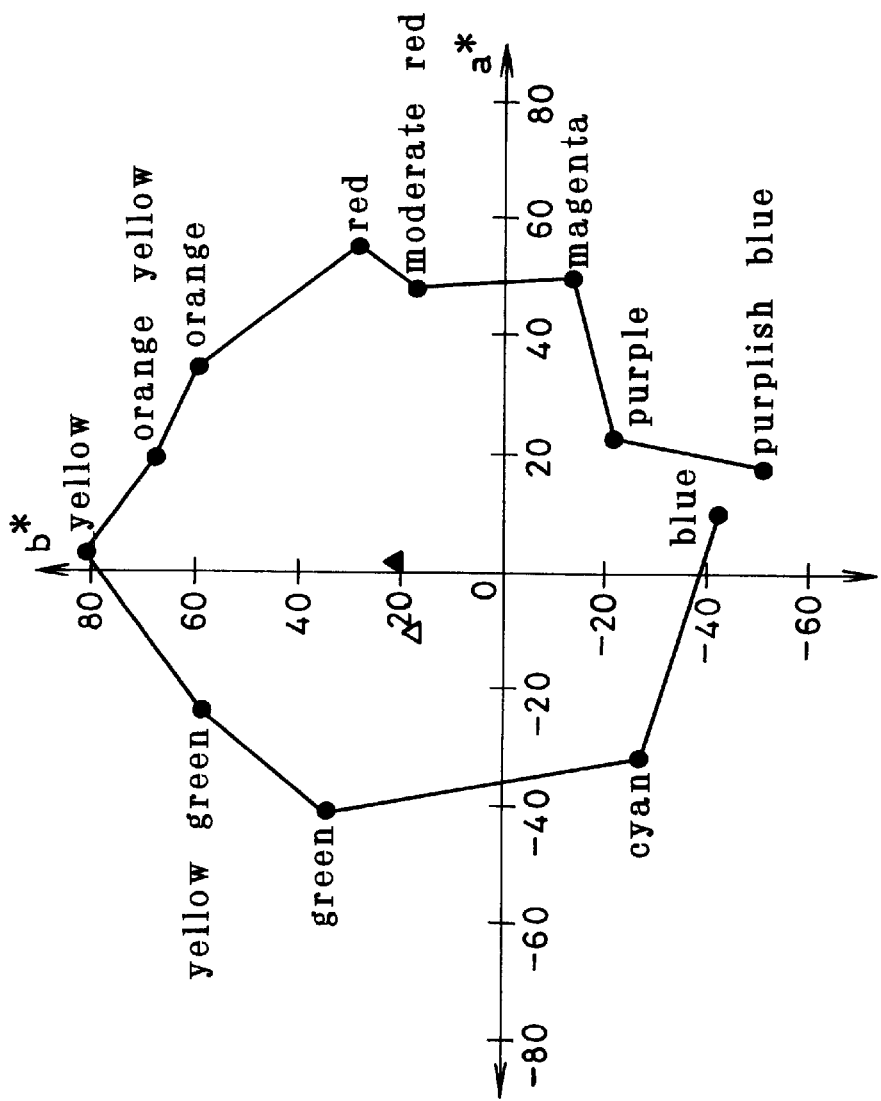
FIG. 2 is a graph illustrating color reproduction of a gray reference reflector plate in a coordinate system of the L*a*b* space according to CIE 1976.

In FIG. 1, the white flourescent lamp of the F6 type has energy distribution with very low uniformity. When light from the white flourescent lamp is reflected by a gray reference reflector plate with reflectance of 18% (hereinafter referred to as a gray reflector plate), the light becomes reproduced in various colors in an optical instrument or camera according to spectral sensitivity of the optical instrument. If the optical instrument has ideal spectral sensitivity of R-G-B color matching functions according to CIE 1931, the gray reflector plate photographed by the optical instrument is reproduced in a pale yellow color, which is illustrated in FIG. 2 in the coordinate system of the L*a*b* space according to CIE 1976. The reproduced color of the gray reflector plate is the light source color of the white flourescent lamp of the F6 type as viewed through the optical instrument having the spectral sensitivity of the R-G-B color matching functions. According to the degree at which an actual spectral sensitivity of the optical instrument is less near to the ideal spectral sensitivity, the reproduced color is less near to the pale yellow color. Note that the black dots in FIG. 2 are determined by plotting twelve colors in the center of the Macbeth color checker.

There is a color negative photo film of a daylight type known with the trade name of Super G Ace 800 (manufactured by Fuji Photo Film Co., Ltd.). When the gray reference reflector plate is photographed with this photo film, the reproduced color becomes greenish in comparison with the photo film of the spectral sensitivity of the R-G-B color matching functions. Let a photograph be taken on such a daylight type of photo film while a principal object is illuminated with flash light. When a photographic print is finished from this frame by reproducing the principal object in a neutral tone of color, a background scene behind the principal object becomes reproduced in a greenish tone in an unwanted manner, as the background scene is illuminated by the white flourescent lamp.

Figure 3:
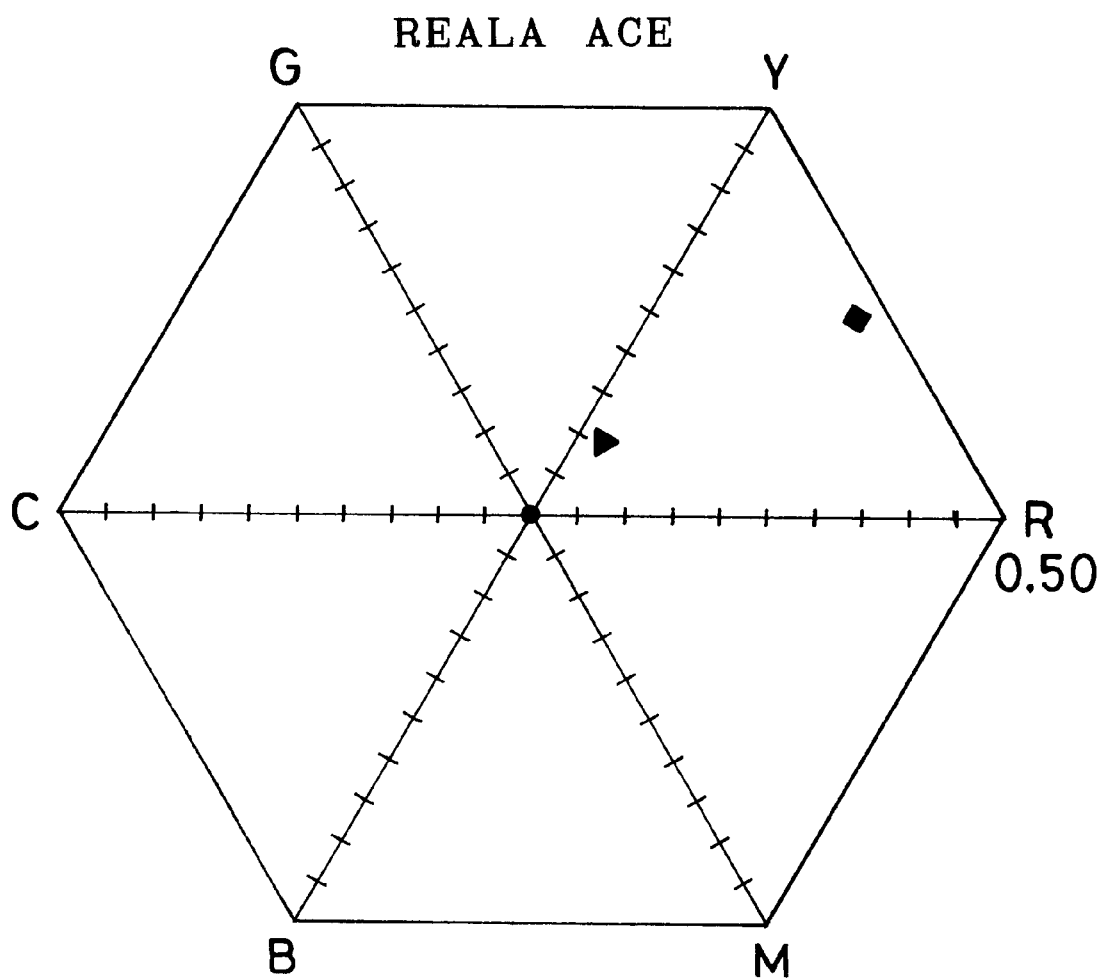
FIG. 3 is a graph illustrating coloration of the gray reflector plate reproduced by use of photo film of a type Reala Ace and plotted in a hexagonal coordinate system.

To avoid reproducing the background scene in the greenish coloration due to the white flourescent lamp, it may be possible to provide the optical instrument with improved spectral sensitivity. However the changes in the optical instrument cause problems which will be described later. Another solution is to use a different type of photo film, for example a daylight type known with the trade name of Reala Ace (manufactured by Fuji Photo Film Co., Ltd.). A camera is loaded with this photo film, on which the gray reflector plate is photographed while illuminated by the white flourescent lamp of the F6 type. In FIG. 3, reproduced coloration or tint of the gray reflector plate is plotted in a hexagonal coordinate system, namely the light source color of the white flourescent lamp of the F6 type in view of this particular photo film.

This hexagonal coordinate system has six coordinates of Red (R), Yellow (Y), Green (G), Cyan (C), Blue (B) and Magenta (M), and adapted to indicate a deviation of coloration to be reproduced with reference to an origin as reference coloration. To be precise, the hexagonal coordinate system is defined by the following.

1. Let (R0, G0, B0) be Status-M converted density of Red (R), Green (G) and Blue (B) determined by the reference coloration at the origin. Let (RP, GP, BP) be Status-M converted density of Red (R), Green (G) and Blue (B) determined by coloration to be plotted. Differences (R', G', B') are defined by

R'=RP−R0,

G'=GP−G0,

B'=BP−B0.

The Status-M converted density will be described later in detail.

2. Let an X-Y orthogonal coordinate system be defined by taking its origin at the origin of the hexagonal coordinate system, and by taking a positive (+) direction of its X-axis along the R-axis of the hexagonal coordinate system. Coordinates (XP, YP) are plotted in the X-Y orthogonal coordinate system, and are defined by:

XP=(R'−G')−(B'−G)/2

YP=(B'−G')×sin (n/3)

The coordinates of the coloration to be plotted in the hexagonal coordinate system are defined by the point in the X-Y orthogonal coordinate system overlapped with the hexagonal coordinate system and according to the coordinates (XP, YP).

The hexagonal coordinate system according to the present specification has the axes of Red (R), Green (G), Blue (B), Cyan (C), Magenta (M) and Yellow (Y) for the coloration of an image on a photographic print.

In FIG. 3, coloration of daylight color is taken as the origin of the hexagonal coordinate system. The graph illustrates deviations of the coloration from the daylight color. The coloration of daylight color is defined equal to the coloration of a gray reference reflector plate illuminated by the CIE standard light source C. In relation to the above-described type of photo film, the gray reflector plate illuminated by the white fluorescent lamp of the F6 type has the coloration being palely yellowish white in comparison with the coloration of daylight color, as is read from FIG. 3. The coloration can be obtained in a manner similar to the color reproduction according to the R-G-B color matching functions.

Figure 4:
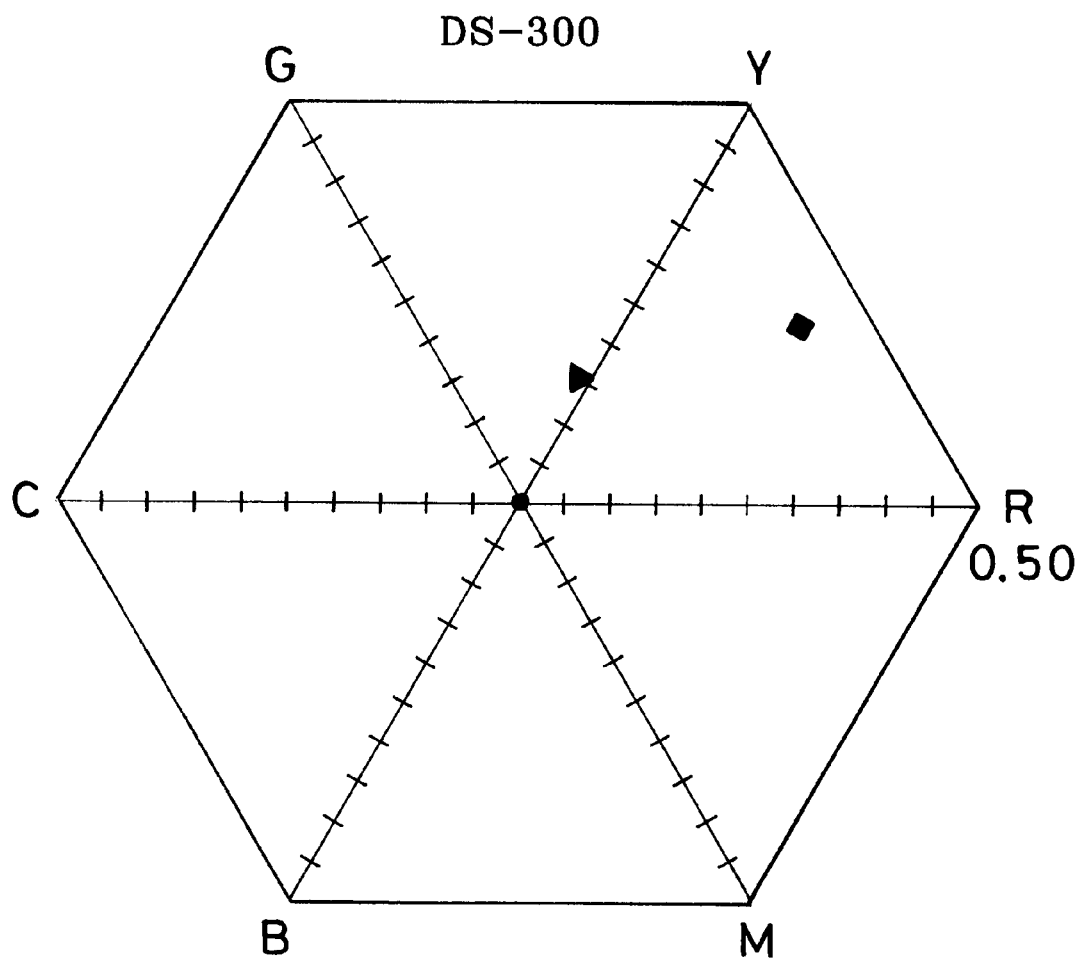
FIG. 4 is a graph illustrating coloration of the gray reflector plate reproduced by a digital still camera of a type DS-300 and plotted in the hexagonal coordinate system.

In FIG. 4, deviations of the coloration from the daylight color are illustrated in using a digital still camera DS-300 (trade name, manufactured by Fuji Photo Film Co., Ltd.) as an optical instrument incorporating a CCD image sensor. The gray reference reflector plate is illuminated by the white fluorescent lamp and picked up by the digital still camera DS-300, and reproduced with the coloration, which is plotted in the graph as light source color of the white fluorescent lamp as viewed through the digital still camera. As a result, a palely yellowish white is created in a manner similar to that of the photo film.

Problems still remain in any of known optical instruments. Although the above-described use of the optical instrument pre-loaded with the photo film or the optical instrument incorporating a CCD image sensor can avoid greenish reproduction of the background scene illuminated by the white fluorescent lamp, there remains yellowish tone in the reproduced image. It is certain that improvement of spectral sensitivity is effective in the lens-fitted photo film unit in which only the predetermined type of the photo film is used, as this optical instrument is pre-loaded with the photo film. However improvement of spectral sensitivity may be ineffective in a compact camera or single-lens reflex camera, as any type of photo film can be selected and inserted in it by a user.

In view of this situation, researches were made to discover possibility of reproducing the coloration effectively and agreeably by suitably determining light source color (color temperature) of flash light. It was found that neutral color reproducibility could be obtained hen the flash light had the light source color near to that of the white fluorescent lamp as background light source in view of the photo film, the CCD image sensor or the like.

Figure 5:
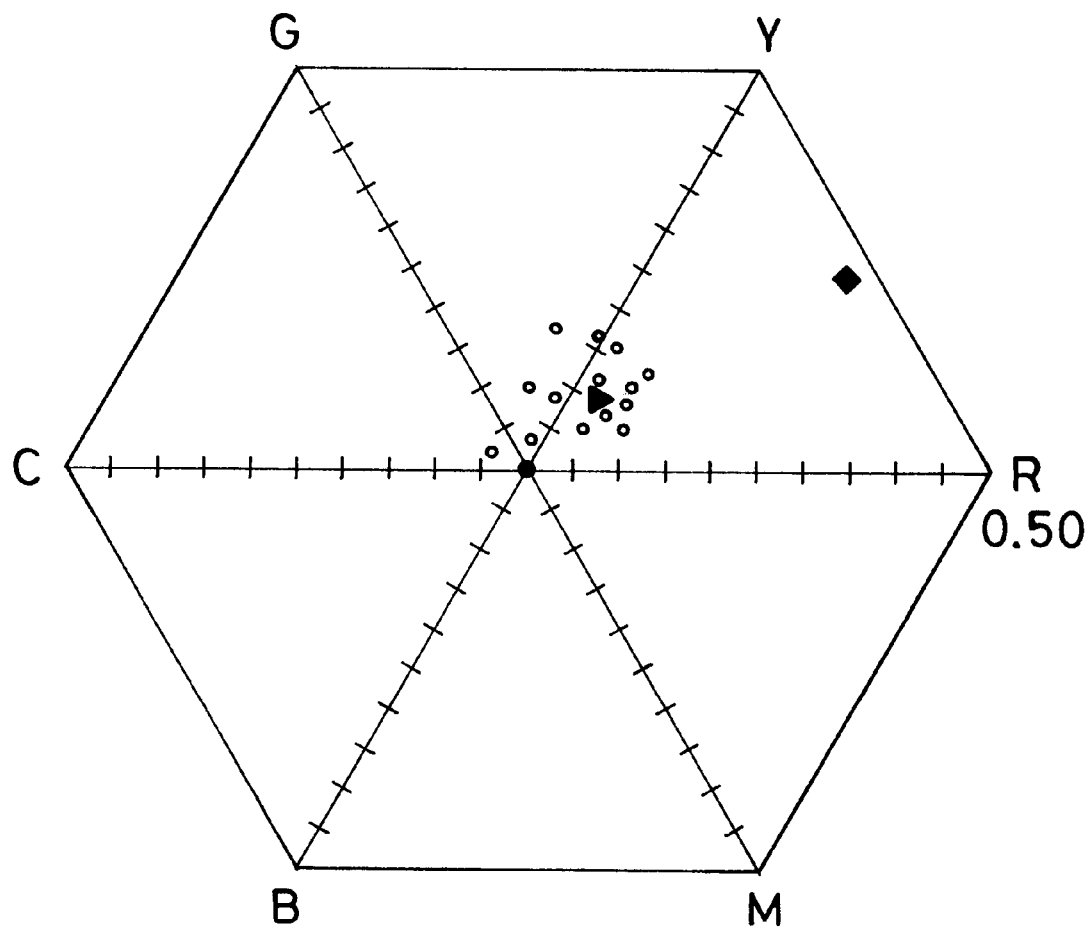
FIG. 5 is a graph illustrating coloration reproduced by use of photo film of a type Reala Ace with various light sources and plotted in the hexagonal coordinate system.

Experiments were conducted by use of the flash light with various colors of light in combination with the photo films Super G Ace 800 and Reala Ace. FIG. 5 is a graph with the hexagonal coordinate system illustrating the coloration of an image of the gray reference reflector plate illuminated with each of light sources and photographed on Reala Ace.

As a result, it was found that the color of the flash light could be determined to satisfy the condition of:

$$0 \leq \Delta E \leq 0.08$$

for the purpose of reproduction of both the principal object illuminated by the flash light and the background scene illuminated by the white fluorescent lamp with fidelity in color, where $\Delta E$ is a light source color difference amount between the flash unit and a white fluorescent lamp of the F6 type. Namely, $\Delta E$ is a distance defined in the hexagonal coordinate system having the origin at the coloration reproduced by photographing the gray reference reflector plate illuminated by the standard light source C and at a proper exposure, and which is determined between the coloration reproduced by photographing the gray reflector plate illuminated by the white fluorescent lamp of the F6 type and at a proper exposure, and the coloration reproduced by photographing the gray reflector plate illuminated by the flash light and at a proper exposure. Furthermore, the color of the flash light, more preferably, should satisfy the condition of:

$$0 \leq \Delta E \leq 0.06$$

and desirably, should satisfy the condition of:

$$0 \leq \Delta E \leq 0.04.$$

The distance $\Delta E$ is defined by the following equations:

$$\Delta E = \sqrt{[(X_1-X_2)^2+(Y_1-Y_2)^2]}$$

$$X_1 = [(RF-R0)-(GF-G0)]-[(BF-B0)-(GF-G0)]/2$$

$$Y_1 = [(BF-B0)-(GF-G0)] \times \sin(\pi/3)$$

$$X_2 = [(RS-R0)-(GS-G0)]-[(BS-B0)-(GS-G0)]/2$$

$$Y_2 = [(BS-B0)-(GS-G0)] \times \sin(\pi/3)$$

In the equations:

RF, GF and BF are Status-M converted density of Red (R),

Green (G) and Blue (B) of the gray reference reflector plate which is illuminated by the F6 white fluorescent lamp and reproduced at a proper exposure;

RS, GS and BS are Status-M converted density of Red (R), Green (G) and Blue (B) of the gray reflector plate which is illuminated by an electronic flash device and reproduced at a proper exposure;

R0, G0 and B0 are Status-M converted density of Red (R), Green (G) and Blue (B) of the gray reflector plate which is illuminated by the standard light source C and reproduced at a proper exposure.

The definition of the Status-M converted density is now described. The Status-M converted density can be used to obtain $\Delta E$ and the like by plotting points in the hexagonal coordinate system.

Silver halide camera as optical instrument for use with color photo film as recording medium. The Status-M converted density of the color photo film is used. If the photo film is color reversal photo film, the sign of the value of the density is reversed. $\gamma$ of the recording medium is linearly converted to 0.65, which is a standard value of $\gamma$ for the color negative photo film. Thus the Status-M converted density is obtained.

Digital still camera as optical instrument. Object brightness of a photographic object is measured by the CCD unit, digitized, processed suitably according to halftone processing, and stored as image data. The operation of the halftone processing can be recognized by picking up the object such as a gray chart with known reflectance. The image data, when subjected to reverse conversion, can be converted into the object brightness. The object brightness being obtained is logarithmically converted. $\gamma$ of the recording medium is converted to 0.65, which is a standard value of $\gamma$ for the color negative photo film. Thus the Status-M converted density is obtained.

Further experiments were conducted. A background scene was illuminated by a tungsten light source or the CIE standard light source A. The gray reference reflector plate was illuminated by flash light of various colors, and was photographed at a proper exposure, so as to be observed for color reproducibility. As a result with the photo film Super G Ace 800, when the flash light satisfying $\Delta E \leq 0.05$ was used, reddish coloration of the background scene due to the flash light was remarkable to cause unwanted color reproducibility. In using the photo film Reala Ace, when the flash light satisfying $\Delta E \leq 0.06$ was used, very agreeable color reproducibility was obtained, as the colorfulness was decreased without changes in coloration or chromaticity of the background scene despite the use of the tungsten light source. When photographic prints were produced by use of a photographic printer operable for effective correction of colors, very agreeable results were obtained, as color failure of coloring a principal object in cyan was decreased. Also similar experiments were conducted with the still camera DS-300 which had characteristics related to fluorescent lamps similar to those of Reala Ace. Finally, a result similar to that of Reala Ace was obtained.

After a research on those results, it was found that a difference in the color reproducibility between the photo films Super G Ace 800 and Reala Ace was derived from a phase angle or hue angle $\theta$ defined in the hexagonal coordinate system from the gray reference reflector plate reproduced while illuminated by the F6 white fluorescent lamp. The hue angle $\theta$ according to Super G Ace 800 was 103°. The hue angle $\theta$ according to Reala Ace was 55°. Note that the hue angle $\theta$ in the hexagonal coordinate system is defined as an angle at which a vector defined from the origin O to a point at the coordinates to be represented by the hue angle $\theta$ is open rotationally with reference to a vector O-R or a direction along the R-axis. The hue angle $\theta$ is measured in a counterclockwise direction about the origin O from the vector O-R, which itself has the hue angle $\theta$ of zero (0) degree.

Results from various experiments were observed and investigated, so that a preferable construction of an optical instrument was discovered. In consideration of a tungsten light source, the above-described preferable condition of the distance $\Delta E$ should be satisfied. Also, the phase angle or hue angle $\theta$, which was obtained from the gray reference reflector plate and the F6 white fluorescent lamp and defined in the hexagonal coordinate system, should satisfy a condition of:

$$40° \leq \theta \leq 90°.$$

More preferably, the optical instrument should satisfy a condition of:

$$55° \leq \theta \leq 80°.$$

To be precise, the phase angle or hue angle $\theta$ is defined as a value satisfying the conditions of:

if $X_1=0$ and $Y_1=0$, then $\theta=0°$,
if $X_1 \neq 0$, then $\theta = \tan^{-1}(Y_1/X_1)$,
if $X_1 > 0$, $Y_1 \geq 0$, then $0° \leq \tan^{-1}(Y_1/X_1) \leq 90°$,
if $X_1 < 0$, $Y_1 \geq 0$, then $90° \leq \tan^{-1}(Y_1/X_1) \leq 180°$,
if $X_1 < 0$, $Y_1 \leq 0$, then $180° \leq \tan^{-1}(Y_1/X_1) \leq 270°$,
if $X_1 > 0$, $Y_1 \leq 0$, then $270° \leq \tan^{-1}(Y_1/X_1) \leq 360°$.
It is to be noted that
if $X_1=0$, $Y_1>0$, then $\theta=90°$,
if $X_1=0$, $Y_1<0$, then $\theta=270°$.

Those conditions being satisfied, the optical instrument can provide good color reproducibility particularly for indoor photography. Note that, after conducting experiments, it was observed that desirable color reproducibility was obtained after the use of a white fluorescent lamp, a tungsten light source, and most of all the other indoor light sources.

It is to be noted that problems are likely to occur when the optical instrument satisfying the above-described preferable condition of the distance $\Delta E$ is used outdoors under daylight, as follows:

Problem A. A background scene to be photographed is illuminated by daylight, while a principal object is illuminated by mixture of daylight and flash light.

Problem B. A single recording medium is provided with frames of both photographic scene photographed outdoors under daylight and the photographic scene photographed with the mixed light described in connection with problem A. If a certain type of automatic printer is used to produce prints from such frames, it is impossible to specify the characteristic of the recording medium, the type of light source or the like. Even though a first one of the scenes is normally printed, the second one of the scenes is involved with color failure due to influence of printing of the first scene. Inevitably at least part of all the frames are unsuitably printed in view of the color reproducibility.

As a result of observation, it has been found that problem A is not serious, because there occurs no great difference in the color reproducibility when the principal object receives mixture of the flash light and daylight. Problem B should be resolved by ideas which will be described heretofore. Such ideas are different between a silver halide camera as the optical instrument for use with photo film and a digital still camera as the optical instrument incorporating the CCD image sensor.

In a silver halide camera, it is necessary to obtain acceptable color balance in a state recorded in the photo film. The coloration or color balance (chromaticity) of object light from a photographic object to be incident on an emulsion surface of the photo film can be changed for this purpose. There are various structures for changing the coloration, such as an insertable color filter or light balancing (LB) filter, and a color liquid crystal display panel (LCD). Among them, the light balancing filter is the simplest. At the time of photographing an object under daylight, the light balancing filter is inserted in such a manner that the coloration obtained by properly photographing the gray reference reflector plate illuminated by daylight is substantially equal to the coloration obtained by properly photographing the gray reflector plate illuminated by the flash light. Thus it is possible that the color balance obtained by use of an indoor light source can be near to that obtained by use of daylight as light source. Photographic prints can be obtained with suitable color reproducibility even when the above-described type of automatic printer is used.

The light balancing filter may be inserted either manually or automatically, but desirably should be automatically inserted. For the automatic structure, the insertion of the light balancing filter can be associated with flash emission. Most of the flashed scenes are indoor scenes. An externally operable flash charger button for the flash emission is connected with a mechanism for insertion of the light balancing filter. Alternatively a camera may have a unit for measuring object brightness, a unit for determining the flash emission when the object brightness is sufficiently low, and a mechanism actuated according to a result of evaluating the object brightness for insertion of the light balancing filter. Also, the insertion of the light balancing filter can be associated with measurement of object brightness without relation to flash emission. If object brightness is equal to or more than reference brightness, the light balancing filter is inserted. Note that a position where the light balancing filter is inserted may be determined at any plane surface crosswise to the light path from a face of a photographic optical system to a focal plane which is a photo film surface of a photo film.

Furthermore, it is possible to record information to the photo film for representing the use or lack of the use of the flash emission, and color of the flash light, either the daylight color or the color changed to such near to the light source color of white fluorescent lamp. A photographic printer for use with this type of the photo film is caused to read the information, and designate a printing condition suitable for the state of the photo film related to the flash emission.

In a digital still camera as optical instrument, the color balance of an image being picked up is electrically treated, because the image picked up by CCD image sensor is converted electrically to an image signal. Japanese Patent Application No. 10-33643 suggests a setup unit incorporated a digital still camera. The setup unit determines color correction amounts and a density correction amount according to the halftone condition of the image and the pick-up condition relating to, for example, the environment of picking up the image, for the purpose of correction processing to optimize the color reproduction of the image on a recording medium.

To simplify the construction, the optical instrument such as a digital still camera is caused previously to store parameters for correction of color balance in association with indoor scenes and outdoor scenes under daylight. After the image is picked up, the color balance of the image is corrected according to the environment at the time of picking up. Corrected information of the image is stored, so that a principal object can be reproduced with neutral coloration in the image. Also, the correction of the color balance according to the environment can be preferably determined to be selectable according to the use or lack of the use of the flash emission, which is the same manner as the photo film.

Lens-fitted Photo Film Unit as Embodiment with Photo Film

Figure 6:
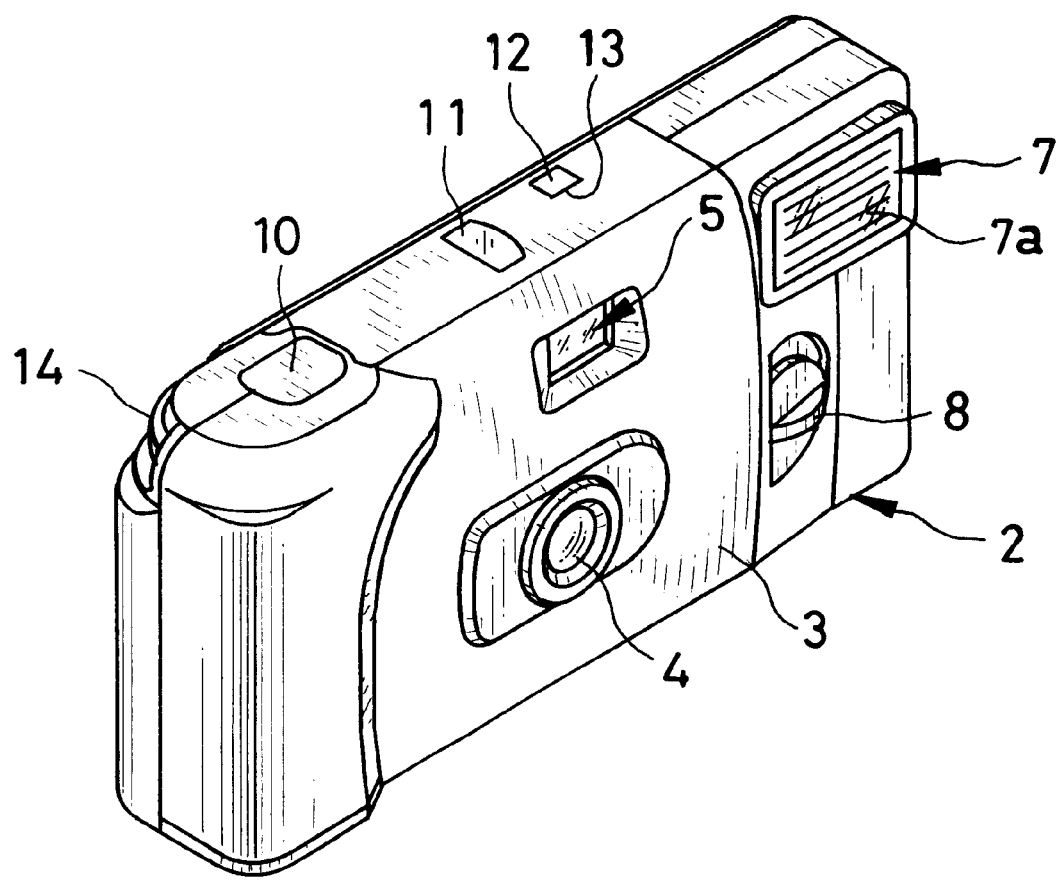
FIG. 6 is a perspective illustrating a lens-fitted photo film unit of the present invention.

In FIG. 6, a lens-fitted photo film unit as an optical instrument is illustrated, and is constituted by a housing 2 and an outer belt 3, which partially covers the housing 2. The housing 2 incorporates mechanisms for taking an exposure, and is pre-loaded with a photo film cassette of the IX240 type available in the market.

The front of the housing 2 is provided with a taking lens 4, a viewfinder 5, an electronic flash unit 7 and a flash charger button 8 as mode selector. The top of the housing 2 is provided with a release button 10, a frame counter window 11 and an opening 13. The frame counter window 11 indicates the number of remaining available frames. The opening 13 is formed for emerging of a light guide member 12, which indicates completion of flash charging. A winder wheel 14 is disposed to be operable through the rear wall of the housing 2, and rotated at each time of taking one exposure. An inner surface of the outer belt 3 is coated with adhesive agent to attach the outer belt 3 to the center of the housing 2. There are openings formed in the outer belt 3 for emerging of the taking lens 4, the viewfinder 5, the frame counter window 11 and the like externally.

A flash discharge tube (not shown) is incorporated in the flash unit 7. A protector/diffuser plate 7a is disposed in front of the flash discharge tube in the flash unit 7, protects the same, and diffuses flash light in a predetermined distribution pattern. Flash light emittable by the flash unit 7 is provided with light source color (color temperature) predetermined by such a structure as a dye filter secured to a front of the protector/diffuser plate 7a or a colored coating formed on the protector/diffuser plate 7a. In other words, flash light emitted by the flash unit 7 is set at a predetermined spectral energy distribution.

A hexagonal coordinate system is defined by setting an origin at coloration or tint which is reproduced by photographing a gray reference reflector plate at a proper exposure with illumination from the standard light source C, the gray reflector plate having reflectance of 18%. First coloration of the gray reflector plate is plotted in the hexagonal coordinate system as photographed at a proper exposure with illumination from the F6 type of white fluorescent lamp. Second coloration of the gray reflector plate is plotted in the hexagonal coordinate system as photographed at a proper exposure with flash light. A distance or light source color difference amount $\Delta E$ is defined between the first and second colorations. The color of the flash light with reference to spectral sensitivity of the photo film to be used is determined to satisfy the condition of:

$$\Delta E \leq 0.06.$$

The flash charger button 8 is connected with a flash switch for turning on and off the flash unit. When the flash charger button 8 is slid up to its ON position, the flash switch is turned on to start charging. Also the flash emission is allowed. Upon completion of the charging, the release button 10 is depressed for taking an exposure with the flash charger button 8 kept in the ON position. In synchronism with the exposure, the flash unit 7 emits flash light to a photographic object 18. When the flash charger button 8 is slid down to its OFF position, the flash switch is turned off to stop charging and to inhibit flash emission.

Figure 7:
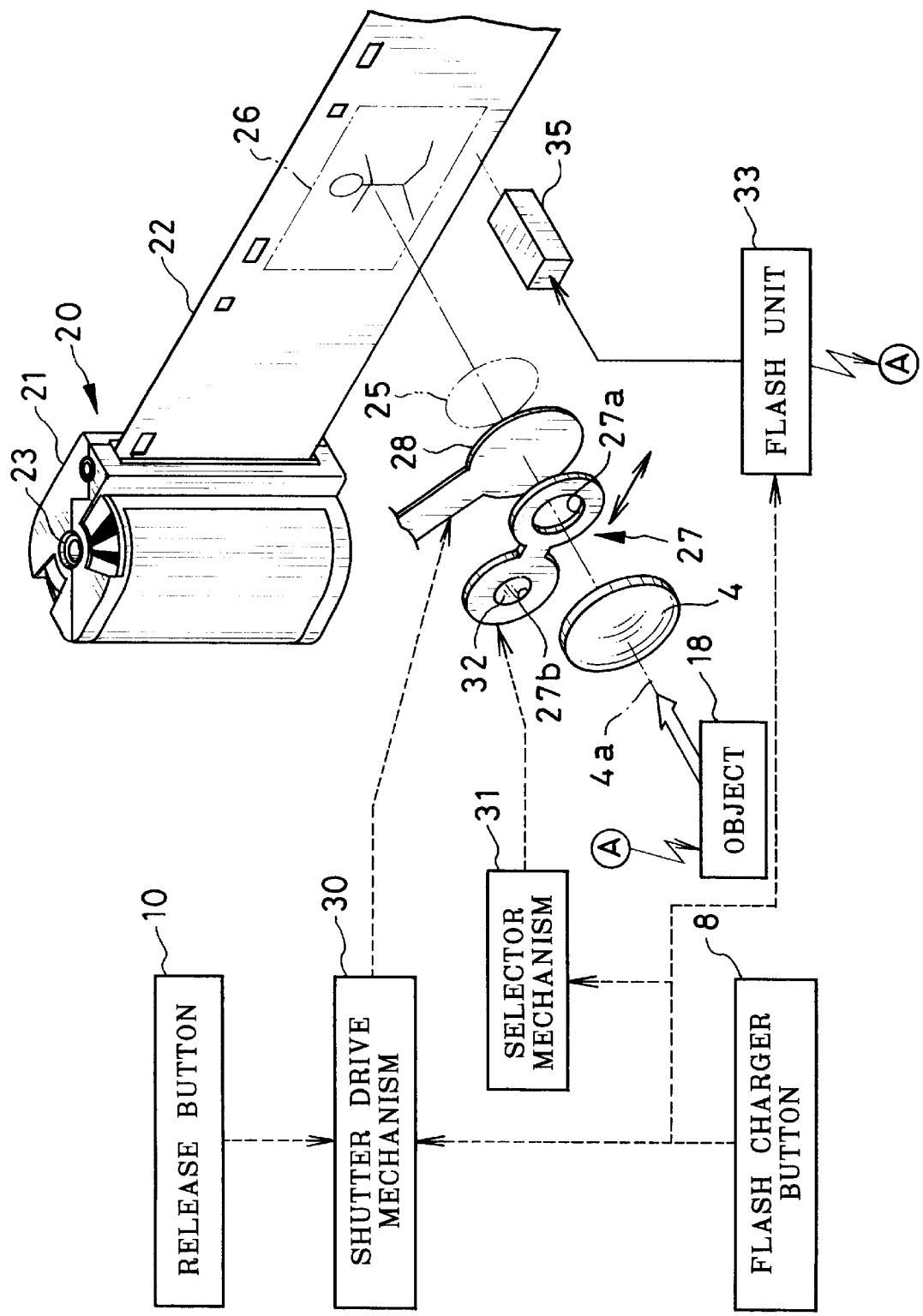
FIG. 7 is an explanatory view in a perspective and a block diagram, illustrating the lens-fitted photo film unit.

In FIG. 7, the lens-fitted photo film unit is depicted. A photo film cassette 20 is inserted in the housing 2 at the time of manufacturing in a factory. The photo film cassette 20 is a combination of a cassette shell 21 and photo film 22 as recording medium. As is similar to the known lens-fitted photo film unit, the photo film 22 is drawn from the cassette shell 21, wound in a roll form and contained in a roll holder chamber in the housing 2. The cassette shell 21 is contained in a cassette holder chamber. Again the above-described hexagonal coordinate system is referred to. A phase angle or hue angle $\theta$ of the first coloration of the gray reference reflector plate is plotted in the hexagonal coordinate system as photographed at a proper exposure with illumination from the F6 type of white fluorescent lamp. The spectral sensitivity of the photo film 22 is determined for the hue angle $\theta$ to satisfy the condition of:

$$40° \leq \theta \leq 90°.$$

An example of the photo film 22 meeting this condition is Reala Ace (manufactured by Fuji Photo Film Co., Ltd.).

The photo film 22 of the IX240 type includes a transparent magnetic recording layer, which is formed on a back surface of a support opposite to an emulsion surface. The photo film 22 has magnetic data tracks for storing various kinds of data in the magnetic recording layer. Among the magnetic data tracks, there are common magnetic data tracks associated with the photo film 22 and common between frames of the photo film 22, and specified magnetic data tracks associated with respectively frames of the photo film 22. The magnetic data tracks are used to store various kinds of information including the photo film 22, a photo film type, an ID number, the use or lack of the use of flash emission, which are written by photo film manufacturer, a photo laboratory, a camera or the like. In an ineffective region defined in a leader portion of the photo film 22, information including the photo film information and the ID number is printed by side printing in forms of numbers and bar codes. When the photo film 22 is developed, the information becomes visible images. In the course of development and printing, the photo film information and the like are read from the magnetic data tracks or the bar code of the photo film 22. Developing and printing operation can be effected in a condition determined according to the obtained information.

A spool 23 is contained in the cassette shell 21 in a rotatable manner. A trailer end of the photo film 22 is retained to the spool 23. The winder wheel 14 has a drive shaft portion, which is engaged with an axial end of the spool 23. When the winder wheel 14 is rotated, an exposed portion of the photo film 22 is wound into the cassette shell 21. An unexposed frame portion of the photo film 22 is set behind the taking lens 4.

A light-shielding tunnel (not shown) is disposed between the taking lens 4 and the photo film 22 to cover a photographing light path in a state shielded from ambient light. A shutter opening 25 is formed in the front of the light-shielding tunnel for introducing object light from the photographic object 18 into the light-shielding tunnel. An exposure station or exposure aperture 26 is formed in the rear of the light-shielding tunnel for determining a size of each frame on the photo film 22. An aperture stop unit 27 and a shutter blade 28 are disposed between the shutter opening 25 and the taking lens 4. A shutter drive mechanism includes a spring, which biases the shutter blade 28 in a direction to close the shutter opening 25.

When the release button 10 is depressed, the shutter blade 28 is caused by the shutter drive mechanism 30 to rotate against the spring and in a direction to open the shutter opening 25. After the shutter opening 25 becomes fully open, the spring causes the shutter blade 28 to rotate in the direction to close the shutter opening 25. The shutter opening 25 is opened and closed for taking an exposure by this back and forth movement of the shutter blade 28. Object light entered through the taking lens 4 passes the shutter opening 25 into the light-shielding tunnel, and exposes the photo film 22 in a region inside the exposure aperture 26.

When the flash charger button 8 is slid to the ON position by a user desiring flash emission, the spring in the shutter drive mechanism 30 associated with the shutter blade 28 is changed over in the biasing force. The shutter blade 28 is driven to swing at a shutter speed higher than that for photography without flash emission.

The aperture stop unit 27 includes a larger opening 27*a* and a smaller opening 27*b*. A selector mechanism 31 in a color balance adjustor is connected with the aperture stop unit 27, and sets one of the larger opening 27*a* and the smaller opening 27*b* to a position in a photographing light path 4*a* along an optical axis of the taking lens 4. When the flash charger button 8 is slid to the ON position, the selector mechanism 31 sets the larger opening 27*a* in the photographing light path 4*a*. When the flash charger button 8 is slid to the OFF position to disable the flash emission, the selector mechanism 31 sets the smaller opening 27*b* in the photographing light path 4*a*.

This being so, the shutter speed and the aperture stop are set suitably both in the indoor photography with flash light and in the outdoor photography with daylight without flash light, because of changing over of the shutter drive mechanism 30 and the selector mechanism 31.

A color filter or light balancing (LB) filter 32 included in the color balance adjustor is mounted in the smaller opening 27*b*. If no flash is emitted in taking an exposure, the light balancing filter 32 is kept inserted in the light path. The light balancing filter 32 has a color to change first coloration to second coloration, the first coloration being obtained by properly photographing the gray reference reflector plate with illumination of daylight, and the second coloration being obtained by properly photographing the gray reflector plate with illumination of flash light.

An electronic flash unit 33 consists of a combination including the flash unit 7, the flash switch, a trigger switch, a main capacitor, a dry battery, circuit elements for charging and discharging and the like. The flash switch is turned on and off in connection with the positions of the flash charger button 8. The trigger switch is turned on when the shutter blade 28 moves to its fully open position. Both the flash switch and the trigger switch being turned on, the flash unit 7 applies flash light to the photographic object 18.

Also an optical indicia imprinting unit 35 is incorporated in the lens-fitted photo film unit. When flash light is emitted in taking an exposure, an LED in the optical indicia imprinting unit 35 is turned on to imprint optical indicia on the photo film 22 in a portion outside a frame region as flash emission information.

The operation of the above construction is described now. To take a photograph, a user rotates the winder wheel 14 to advance the photo film 22 by one frame. The shutter is charged by operation of the one-frame advance of the photo film 22. He or she operates the flash charger button 8 selectively as desired, to set use or lack of use of the flash emission.

If flash emission is desired, the flash charger button 8 is slid up and set in the ON position. The flash switch is turned on to start charging the flash unit. The flash unit becomes ready to emit flash light. Also the selector mechanism 31 is caused by the flash charger button 8 to position the larger opening 27*a* in the photographing light path 4*a* of the taking lens 4. The shutter drive mechanism 30 is changed over by operation of the flash charger button 8 in such a manner that the spring in the shutter drive mechanism 30 is changed over to provide lower shutter speed.

After the user finds the completion of charging by checking a light-emitting state of the light guide member 12, he or she pushes the release button 10. In response to this the shutter unit is actuated to open and close the shutter blade 28. Upon the movement of the shutter blade 28 to the fully open position, the synchro switch is turned on to emit flash light. While the shutter blade 28 is open, object light having entered the taking lens 4 is passed through the larger opening 27*a*, the shutter opening 25 and the exposure aperture 26 and reaches the photo film 22 to take an exposure thereon. In synchronism with the flash emission, the optical indicia imprinting unit 35 is driven to imprint an optical indicia to the photo film 22 outside the exposed frame.

If an exposure is desired outdoors under daylight without using flash light, the flash charger button 8 is slid down and set in the OFF position. Then the flash switch is turned off to disable the flash emission. Also the smaller opening 27*b* is caused by the selector mechanism 31 to move into the photographing light path 4*a* behind the taking lens 4. The shutter drive mechanism 30 is changed over in such a manner that the spring in the shutter drive mechanism 30 is changed over to provide higher shutter speed.

When the release button 10 is depressed, the shutter unit is actuated to open and close the shutter blade 28. The shutter speed is higher than in photography with flash emission. Object light passed through the taking lens 4 is introduced in the smaller opening 27*b* at the light balancing filter 32, the shutter opening 25 and the exposure aperture 26, becomes color-balance-revised object light, and reaches the photo film 22 which is exposed.

Similarly an exposure is taken in each frame. After exposing all the frames, a user rotates the winder wheel 14 continuously to wind the photo film 22 entirely into the cassette shell 21. He or she forwards the lens-fitted photo film unit to a photo laboratory. An operator in the photo laboratory removes the photo film cassette 20 from the housing 2, and processes the photo film 22. Photographic prints are produced from the photo film 22.

Samples 1 and 2 are hereinafter described in relation to the above-constructed lens-fitted photo film unit.

Sample 1

A lens-fitted photo film unit according to Sample 1 was produced and incorporated the color negative photo film 22 of a daylight type. A fourth photosensitive emulsion layer was formed according to Japanese Patent Application No. 10-111196 between green-sensitive and red-sensitive emulsion layers. The fourth photosensitive emulsion layer had sensitivity to light with a wavelength of approximately 520 nm. Although the photo film according to Japanese Patent Application No. 10-111196 has photo film speed of ISO 400, the photo film 22 according to Sample 1 had photo film speed of ISO 800 by use of a great grain size of silver halide.

Figure 8:
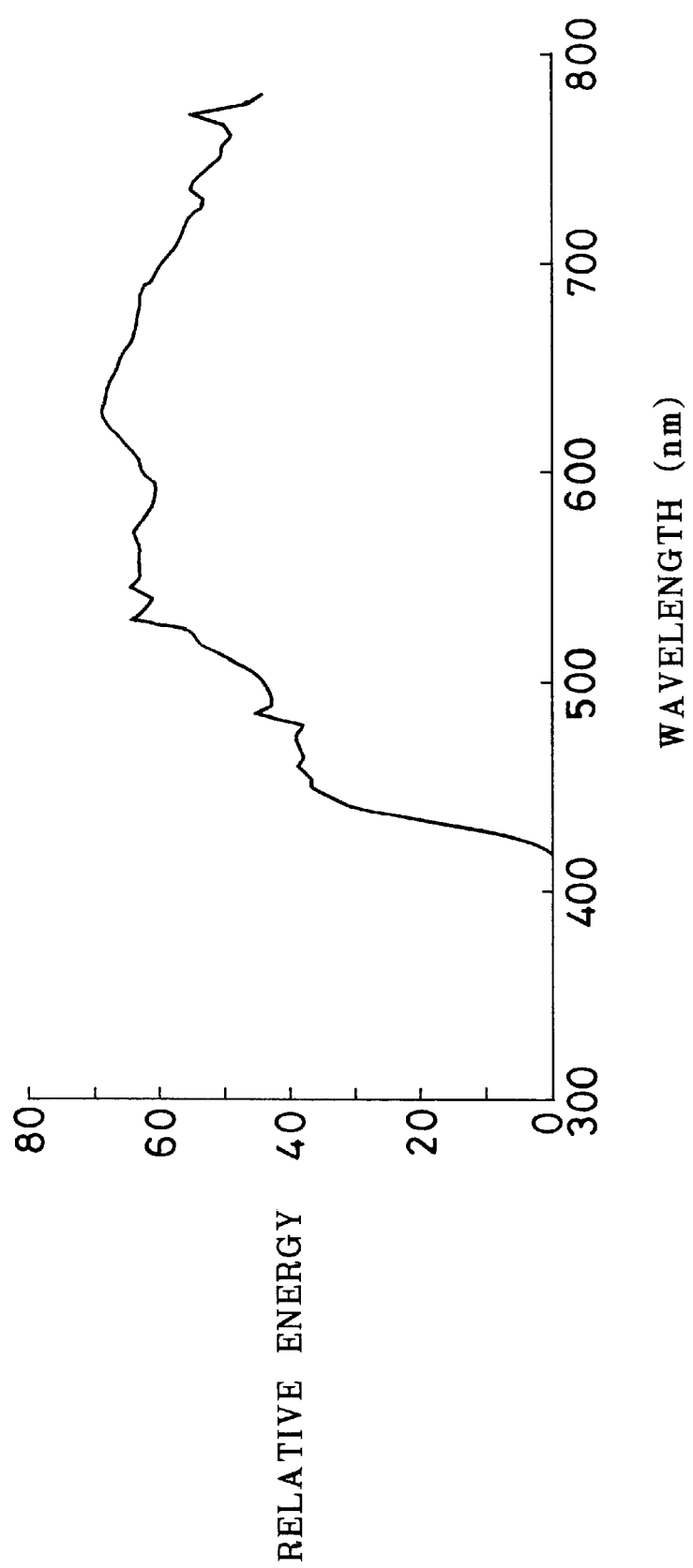
FIG. 8 is a graph illustrating energy distribution of flash light from a flash unit.
Figure 9:
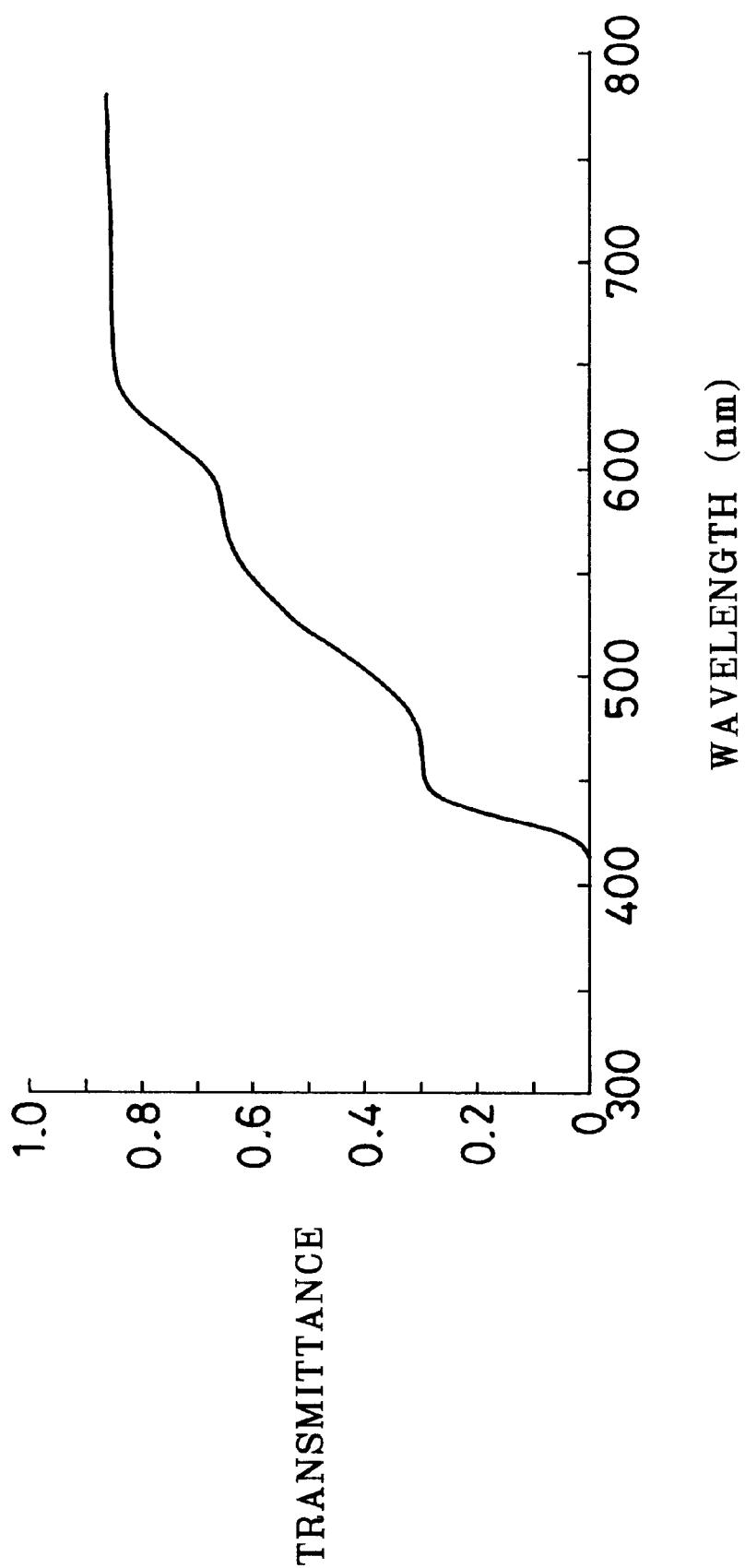
FIG. 9 is a graph illustrating distribution of spectral transmittance of a light balancing filter.

In the flash unit 7, a filter was mounted on the front of the protector/diffuser plate 7a to set spectral energy distribution in an adjusted manner. In FIG. 8, the spectral energy distribution is illustrated. As the light balancing filter 32 was mounted on the smaller opening 27b, object light passed through the light balancing filter 32 was focused on the photo film 22 as color-balance-revised object light when the smaller opening 27b was set in the photographing light path 4a of the taking lens 4. In FIG. 9, spectral transmittance of the light balancing filter 32 is depicted.

Figure 10:
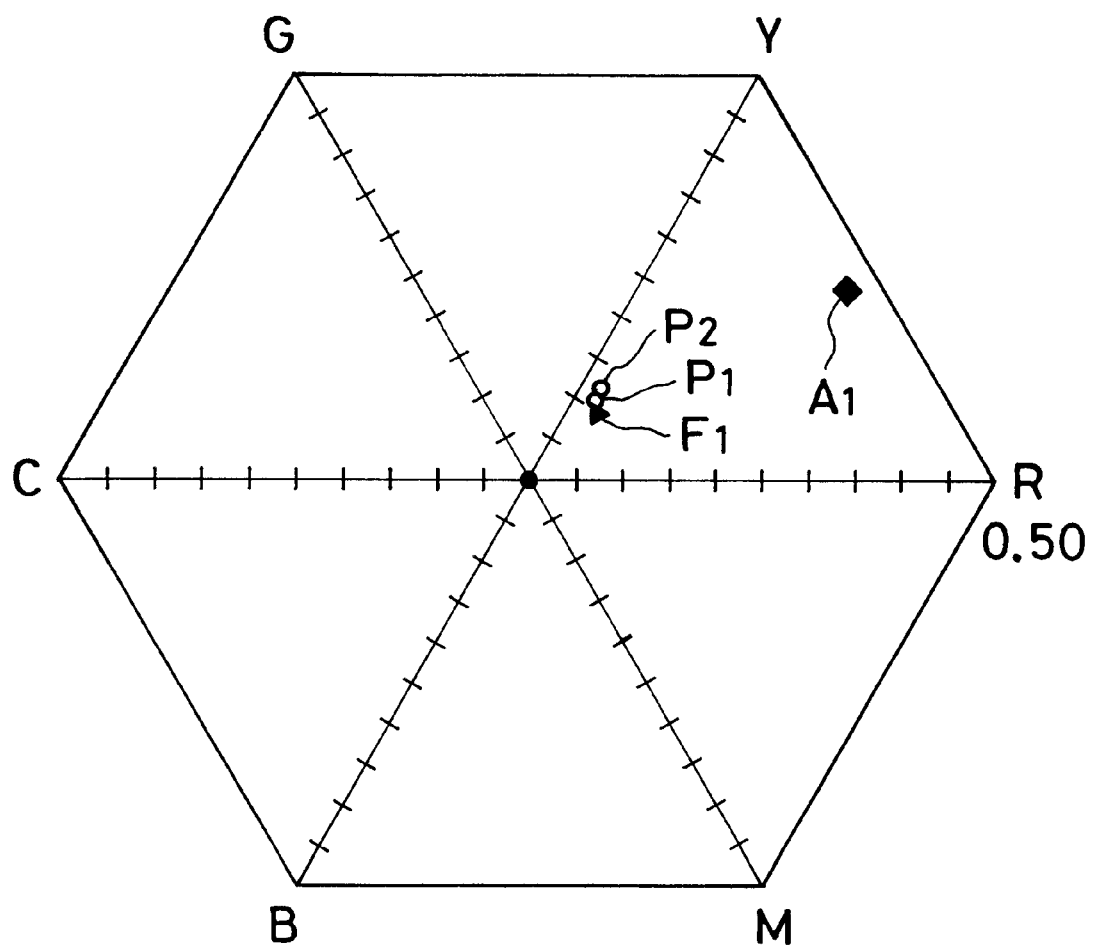
FIG. 10 is a graph illustrating coloration reproduced by the lens-fitted photo film unit with various light sources and plotted in the hexagonal coordinate system.

In FIG. 10, values of colorations of the gray reference reflector plate with reflectance of 18% are plotted in the hexagonal coordinate system in the manner of FIG. 3, the values being obtained according to Sample 1 including the photo film 22. In FIG. 10, a sign $F_1$ represents reproduced coloration of the gray reflector plate illuminated by the F6 white fluorescent lamp without using the light balancing filter 32. A sign $A_1$ represents reproduced coloration of the gray reflector plate illuminated by the tungsten lamp or standard light source A without using the light balancing filter 32. A sign $P_1$ represents reproduced coloration of the gray reflector plate illuminated by the standard light source C and reproduced by using the light balancing filter 32. A sign $P_2$ represents reproduced coloration of the gray reflector plate illuminated by flash light and reproduced without using the light balancing filter 32.

The distance ΔE is defined between the coloration of the gray reference reflector plate with light from the F6 white fluorescent lamp and the coloration $P_2$ of the same with flash light without light balancing filter 32. The distance ΔE according to Sample 1 was 0.03, and satisfied the condition of ΔE≦0.04. The phase angle or hue angle θ of the coloration of the gray reflector plate reproduced while illuminated by the F6 white fluorescent lamp was 55° according to Sample 1 with the photo film, and satisfied the condition of 55°≦θ≦80°.

Relationships of the states of the flash switch being turned on and off in relation to the aperture stop, the shutter speed and the filter insertion of the light balancing filter 32 into the light path are as indicated in the following table.

| | Aperture Stop | Shutter Speed | Filter Insertion |
|---|---|---|---|
| Flash Switched On | f/5.6 | 1/60 sec | No |
| Flash Switched Off | f/16 | 1/125 sec | Yes |

This being so, exposures were taken in an appropriate manner both in the outdoor photography under daylight and in the indoor photography. As the light balancing filter 32 was inserted in the photographing light path 4a, it was possible to prevent existence of frames of different color balances on the single photo film 22.

In the photo film 22 to be loaded in Sample 1, information particular to Sample 1 was written to the magnetic data tracks of the photo film 22. At the time of an exposure with flash light, the optical indicia imprinting unit 35 was driven to imprint optical indicia in the position of the corresponding frame.

To produce color prints from the photo film 22, the following operations were effected in a color printer for the purpose of obtaining high quality of prints.

1. The taking lens being used was recognized by referring to information recorded in the magnetic data track. Distortions and lateral chromatic aberration of the optical system were compensated for.

2. Time information of the photo film was read by referring to the information recorded in the magnetic data track. The halftone of the image was suitably corrected. Also the image was subjected to the grain-shape suppressing process.

3. The use or lack of the use of the flash emission was recognized from the optical indicia. Correction of the color balance and the density at the printing time was determined according to the information of the use or lack of the use of the flash emission.

Comparative Example 1

In contrast to Sample 1, a lens-fitted photo film unit of Comparative example 1 incorporated a flash unit for emitting flash light of color near to the color of the standard light source C, and did not have the light balancing filter 32 to be inserted. Frames were experimentally exposed, and then printed. In Comparative example 1, the distance ΔE between the colorations was 1.0.

Comparative Example 2

A lens-fitted photo film unit was pre-loaded with a conventionally known daylight type of color negative photo film without the fourth photosensitive emulsion layer. The phase angle or hue angle θ of the coloration of the gray reference reflector plate reproduced while illuminated by the F6 white fluorescent lamp was measured according to Comparative example 2 with the photo film, and was 103°. Also, the flash light of Comparative example 2 was changed to have the light source color of the F6 white fluorescent lamp with reference to coloration of reflected gray reflector plate. In Comparative example 2, the distance ΔE between the colorations was 0.04.

Specifics of Sample 1 and Comparative examples 1 and 2 are indicated in the following table.

|  | Distance ΔE | Hue Angle θ | Filter Insertion |
| --- | --- | --- | --- |
| Sample 1 | 0.03 | 55° | Yes |
| Comparative Example 1 | 1.00 | 55° | No |
| Comparative Example 2 | 0.04 | 103° | Yes |

In experiments of Sample 1 and Comparative examples 1 and 2, approximately 200 frames were exposed indoors with flash light, and approximately 100 frames were exposed outdoors without flash light. As a result of Sample 1 according to the present invention, prints were produced from frames with very high reproducibility of color in the indoor photography without occurrence of color failure.

In Comparative example 1, prints of 85 frames among the 200 exposed indoors had color failure in a distinct manner. Prints of 38 frames among the 100 exposed outdoors had color failure which seemed to be influenced by indoor frames.

In Comparative example 2, color reproducibility was found high in prints of frames with a background illuminated by a white fluorescent lamp. However images were reproduced in a reddish coloration particularly when the photographic object 18 was illuminated by a tungsten light source or the like having low color temperature. Color failure occurred conspicuously in the prints, which were all unacceptable. Only prints of 14 frames among the 200 exposed indoors were tolerable.

Consequently, the determination of coloration of the flash light near to the light of the F6 white fluorescent lamp makes it possible to provide photographic prints at high quality without color failure. Also the lens-fitted photo film unit is combined with the photo film on which reproduced light source color of the F6 white fluorescent lamp is within a predetermined range of the phase angle or hue angle θ. This combination provides the more preferable result in the high quality.

Sample 2

Another lens-fitted photo film unit as Sample 2 was produced. Sample 2 contained a color negative photo film 22 of a daylight type. A fourth photosensitive emulsion layer was formed according to Japanese Patent Application No. 10-111196 between green-sensitive and red-sensitive emulsion layers. The fourth photosensitive emulsion layer had sensitivity to light with a wavelength of approximately 520 nm. Unlike Sample 1, the photo film 22 according to Sample 2 had photo film speed of ISO 1600 by use of a great grain size of silver halide.

Figure 11:
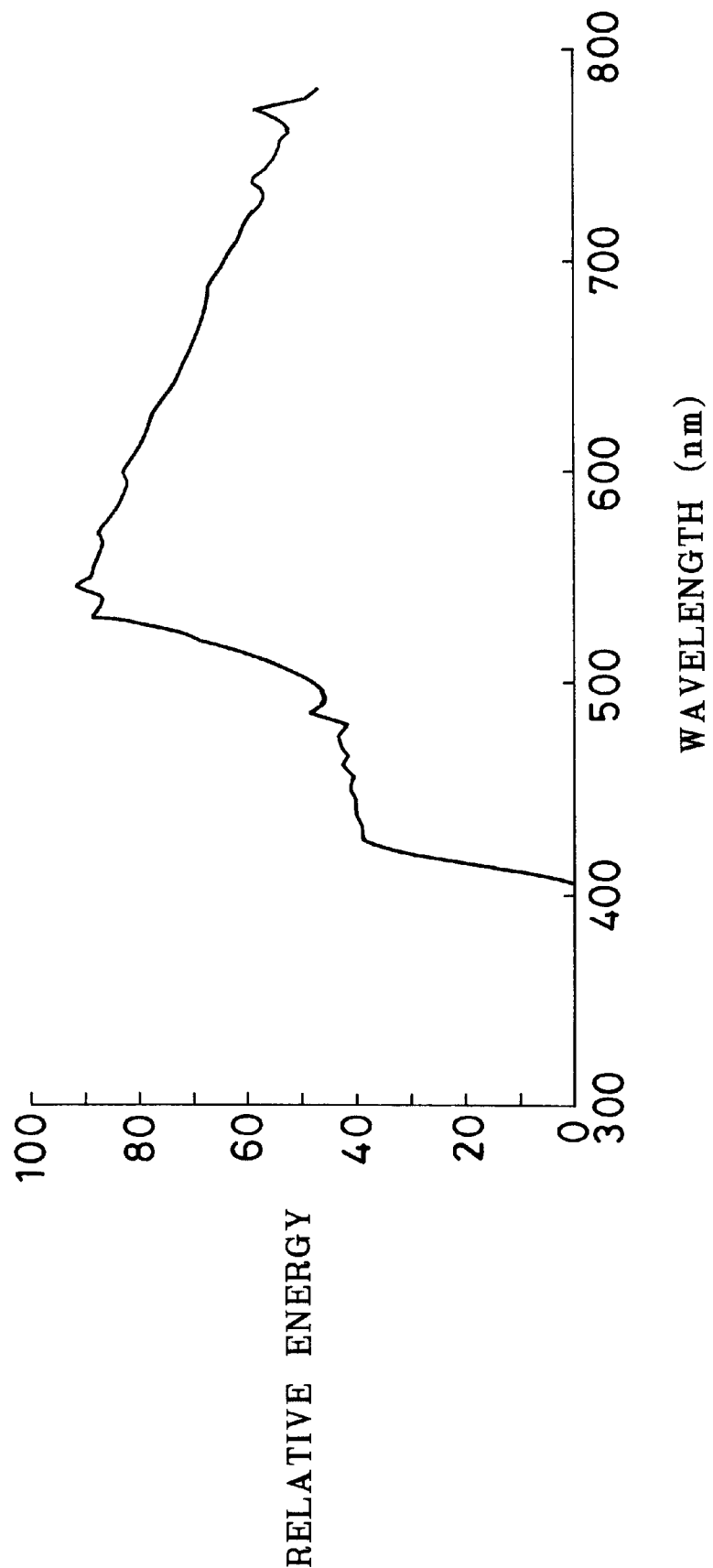
FIG. 11 is a graph illustrating the same as FIG. 8 but of another lens-fitted photo film unit of higher photo film speed.
Figure 12:
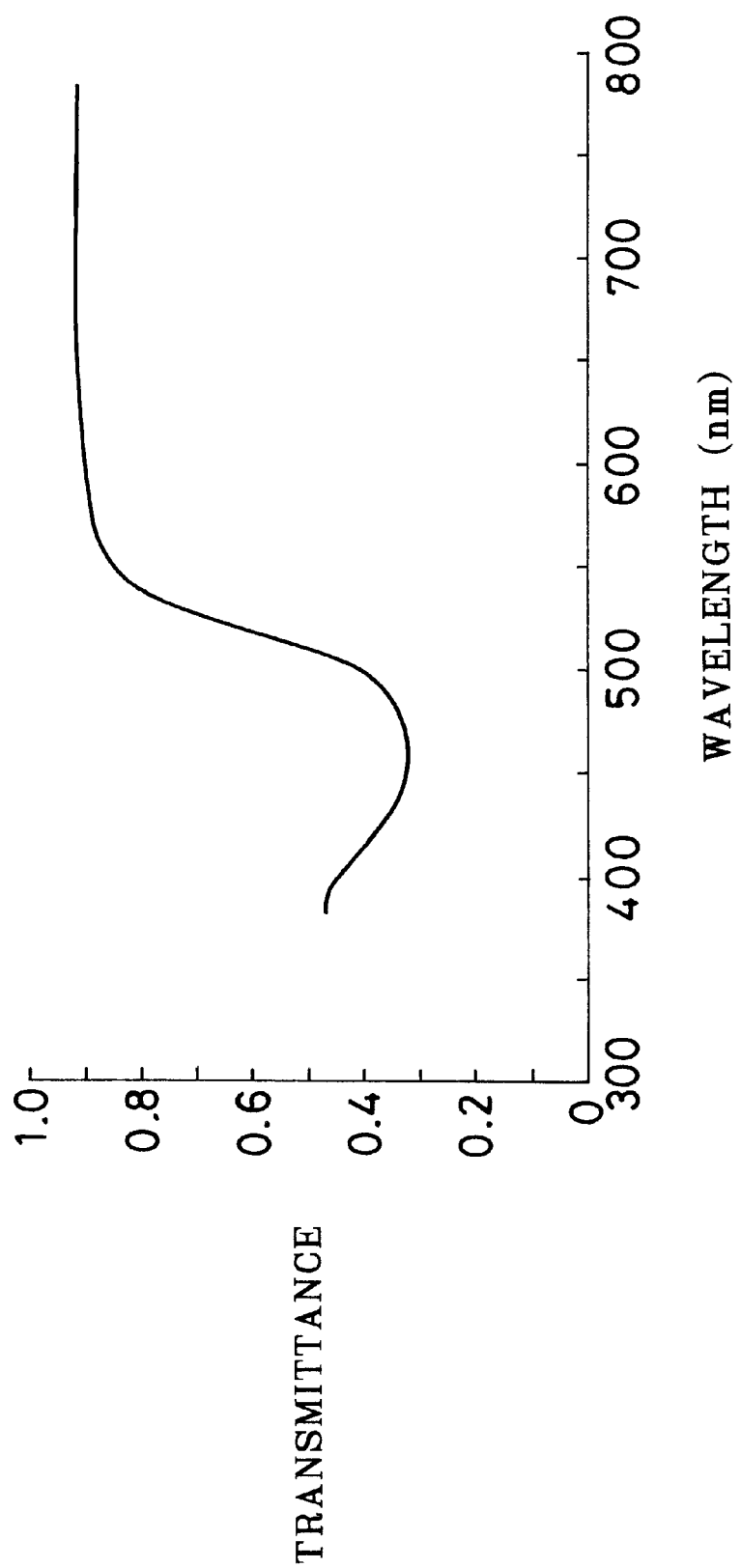
FIG. 12 is a graph illustrating the same as FIG. 9 but of the lens-fitted photo film unit of FIG. 11.

For flash light, a filter was fitted on the front of the protector/diffuser plate 7a of the flash unit 7 to provide the flash light with spectral energy distribution as illustrated in FIG. 11. The light balancing filter 32 in the smaller opening 27b had the spectral transmittance as illustrated in FIG. 12.

Figure 13:
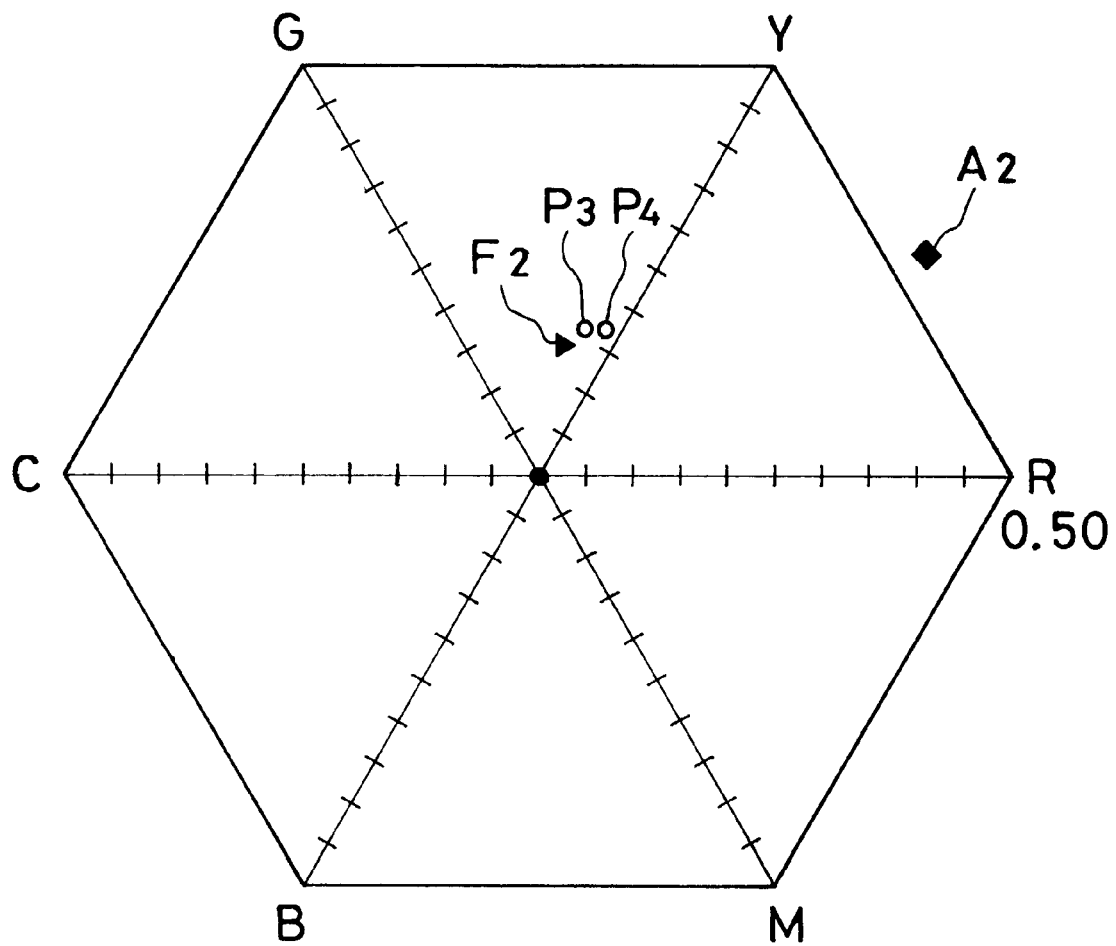
FIG. 13 is a graph illustrating the same as FIG. 10 but of the lens-fitted photo film unit of FIG. 11.

In FIG. 13, values of colorations of the gray reference reflector plate with reflectance of 18% are plotted in the hexagonal coordinate system in the manner of FIGS. 3 and 10, the values being obtained according to Sample 2 including the photo film 22. In FIG. 13, a sign $F_2$ represents reproduced coloration of the gray reflector plate illuminated by the F6 white fluorescent lamp without using the light balancing filter 32. A sign $A_2$ represents reproduced coloration of the gray reflector plate illuminated by the tungsten lamp or standard light source A without using the light balancing filter 32. A sign $P_3$ represents reproduced coloration of the gray reflector plate illuminated by the standard light source C and reproduced by using the light balancing filter 32. A sign $P_4$ represents reproduced coloration of the gray reflector plate illuminated by flash light and reproduced without using the light balancing filter 32.

The distance ΔE is defined between the coloration of the gray reference reflector plate with light from the F6 white fluorescent lamp and the coloration $P_4$ related to the flash light without the light balancing filter 32. The distance ΔE according to Sample 2 was 0.03, and satisfied the condition of $\Delta E \leq 0.04$. The phase angle or hue angle θ of the coloration of the gray reflector plate reproduced while illuminated by the F6 white fluorescent lamp was 83° according to Sample 2 with the photo film, and satisfied the condition of $40° \leq \theta \leq 90°$.

In Sample 2, relationships of the states of the flash switch being turned on and off in relation to the aperture stop, the shutter speed and the filter insertion of the light balancing filter 32 into the light path were predetermined, were the same as those of Sample 1 as indicated in the above table.

In an experiment of Sample 2, approximately 200 frames were exposed indoors with flash light, and approximately 100 frames were exposed outdoors without flash light. Photographic prints were produced. As a result of Sample 2 according to the present invention, the prints were produced from frames with very high reproducibility of color in the indoor photography without occurrence of color failure.

Variant Sample

A lens-fitted photo film unit was provided with a light balancing filter of blue color fitted in the larger opening 27a without mounting the light balancing filter 32 in the smaller opening 27b. When flash emission was desired, the light balancing filter was kept inserted in the light path. Except for this feature the Variant sample was the same as Sample 1. Test exposures were taken and prints were produced in the same manner as Sample 1. As a result of the experiment, no color failure occurred. Photographic prints were obtained with the color reproduced in a desirable manner. The color balance obtained with indoor illumination was changed to be near to that obtained with daylight. Color failure as influence of certain scenes to others is kept from occurrence, as the indoor illumination is passed through the blue filter and becomes incident upon the photo film.

Compact Camera as Embodiment with Photo Film

Figure 14:
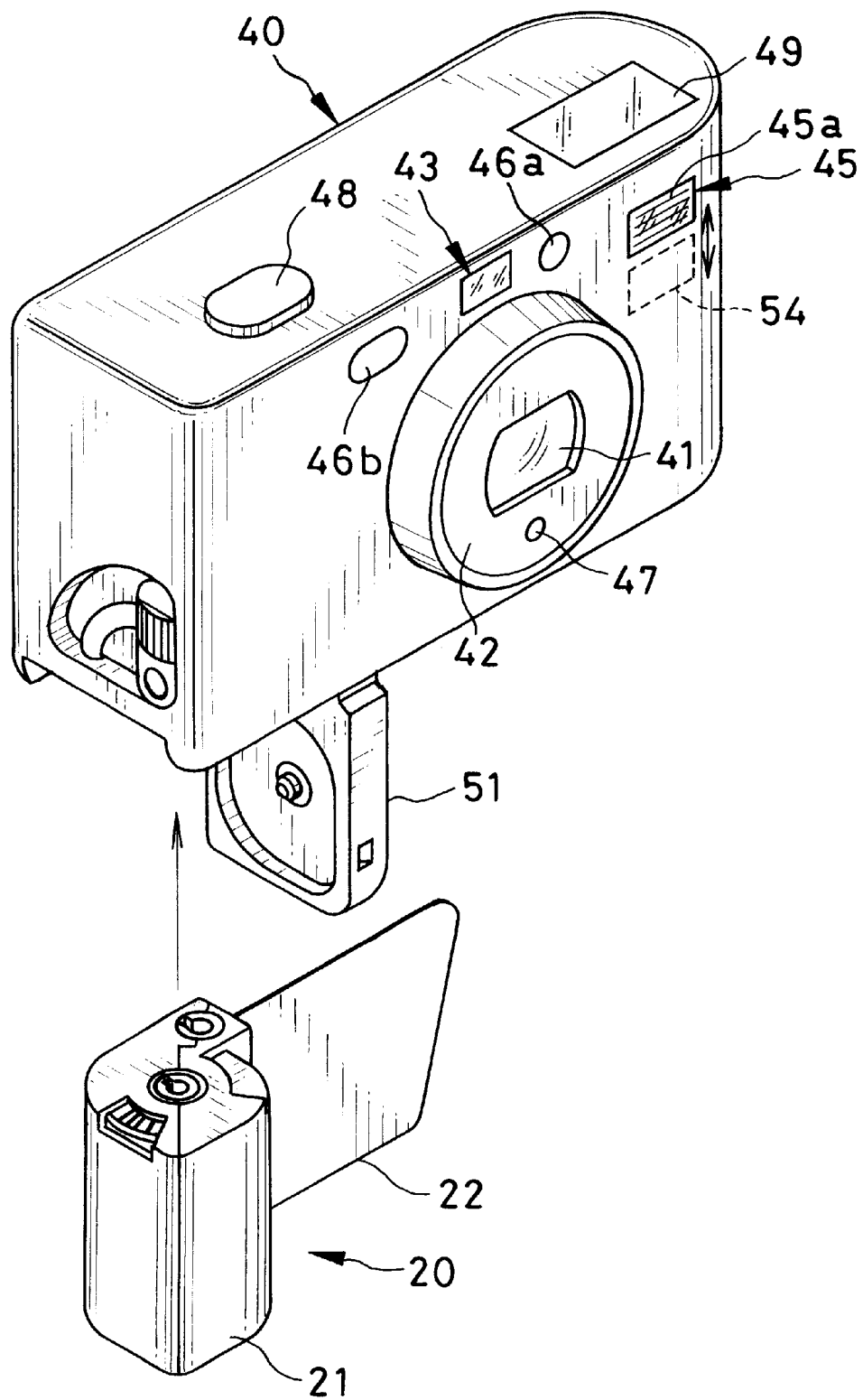
FIG. 14 is a perspective illustrating a compact camera of the present invention.

In FIG. 14, a compact camera with a structure according to the present invention is depicted. A camera body 40 has a front wall, in which there are disposed a lens barrel 42, a viewfinder 43, a flash emitter 45 in an electronic flash unit and an auto-focusing (AF) unit. The lens barrel 42 supports a taking lens 41. The auto-focusing (AF) unit includes a projector 46a and a photo receptor 46b. A photometric window 47 is disposed on a front face of the lens barrel 42 for measuring object brightness of the photographic object 18. A release button 48 and a liquid crystal display device or panel (LCD) 49 are arranged on a top of the camera body 40. The LCD 49 indicates information such as the number of frames.

The camera is used with the photo film cassette 20 the same as that contained in the lens-fitted photo film unit. A bottom lid 51 is disposed in the bottom of the camera body 40, and openable for loading and removal of the photo film cassette 20.

When the release button 48 is halfway depressed, the projector 46a emits a rangefinding beam to the photographic object 18. The beam is reflected by the photographic object 18, and then received by the photo receptor 46b so as to measure the object distance. Also the object brightness is measured through the photometric window 47 by use of a photo receptor element. The release button 48 is then depressed fully. The taking lens 41 is focused in accordance with the measured object distance, before the shutter blade is controlled to open and close for a light amount determined according to the object brightness. If the object brightness is equal to or less than a predetermined brightness level, the flash emitter 45 is caused to emit flash light in synchronism with the movement of the shutter blade to open and close.

A flash filter 54 in a color balance adjustor is disposed in the camera body 40. A protector/diffuser plate 45a constitutes a front wall of the flash emitter 45. The flash filter 54 is movable between a filtering position and a retracted position retracted from the protector/diffuser plate 45a. The flash emitter 45, when the flash filter 54 is positioned away from it, emits flash light of the daylight color. The flash emitter 45, when the flash filter 54 is positioned in front of the protector/diffuser plate 45a, the directly emitted flash light of the daylight color is changed by the flash filter 54 to coloration-revised flash light having a color different from the daylight color.

As will be described later, the compact camera stores data of relationships between types of the photo film 22 and the use and lack of the use of the flash filter 54. If the photo film 22 being loaded is a type included in a group of particular types, then the flash filter 54 is caused to move to the filtering position.

To be precise, if the photo film 22 satisfying the condition of $\Delta E \leq 0.04$ is loaded in the camera, then the flash filter 54 is moved to the filtering position, wherein $\Delta E$ is the distance between the coloration of the gray reference reflector plate with light from the F6 white fluorescent lamp and the same with coloration-revised flash light passed through the flash filter 54, as defined equally to the above embodiments. The type of the photo film 22 with which the flash filter 54 should be used is hereinafter referred to as particular type.

The flash filter 54 is inserted or not inserted according to the type of the photo film 22. If the photo film 22 is not the particular type, then directly emitted flash light of the daylight color is applied to the photographic object 18. The flash filter 54 being eliminated, the photo film 22 of not the particular type is prevented from unacceptably reproducing the color due to an unwanted combination of the coloration-revised flash light and the spectral sensitivity of the photo film 22 not of the particular type.

Figure 15:
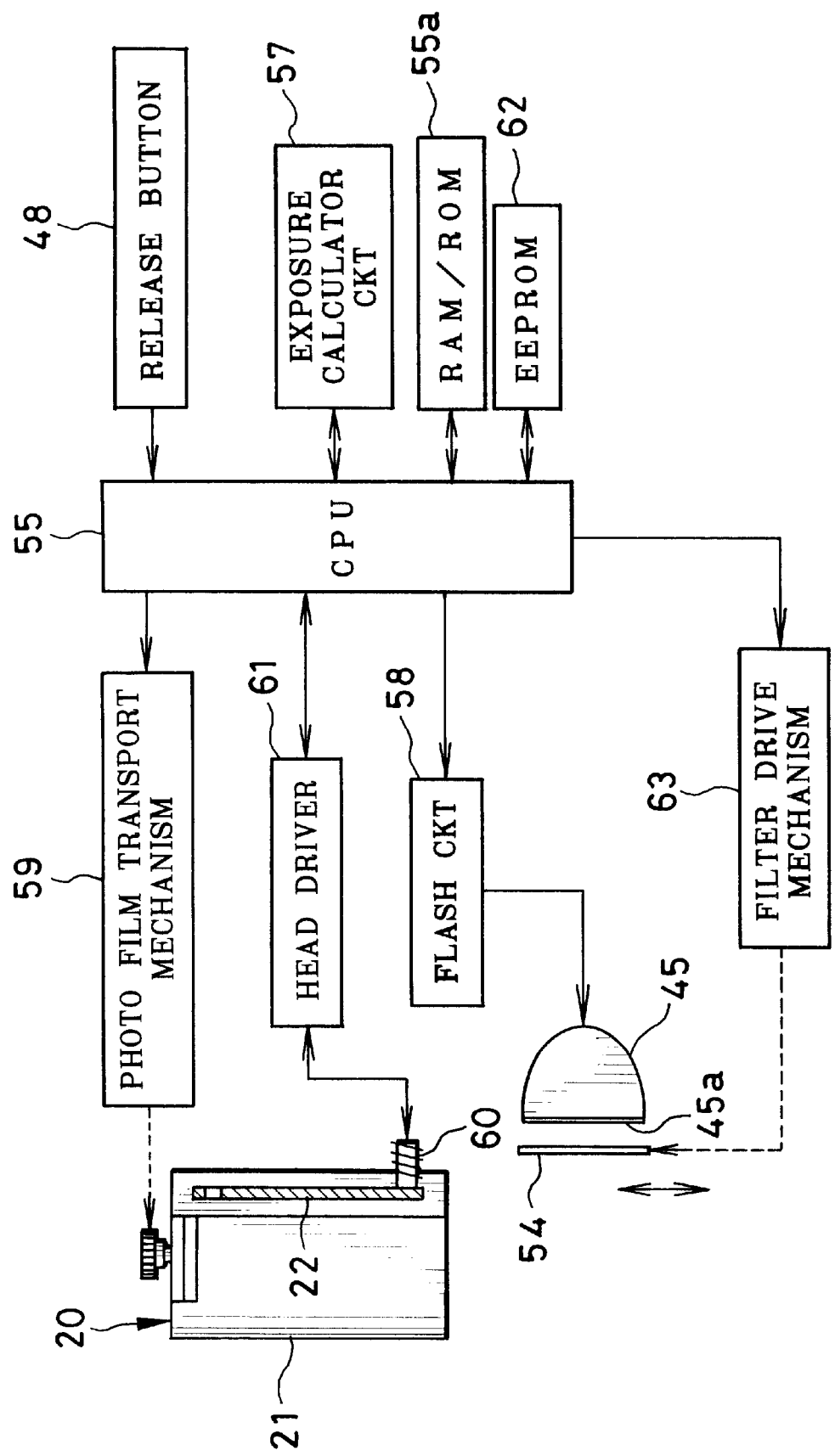
FIG. 15 is a block diagram schematically illustrating the compact camera.

In FIG. 15, elements of the compact camera are depicted. CPU 55 as a mode selector controls various relevant components of the compact camera. An exposure calculator circuit 57 is operated upon half depression of the release button 48, and measures object brightness of the photographic object 18 through the photometric window 47. An optimum exposure amount is calculated according to the measured object brightness. Data of the optimum exposure amount is fed back to CPU 55, and written to an internal memory of CPU 55. When the release button 48 is fully depressed, CPU 55 reads the data from the internal memory after the completion of focusing of the taking lens 41. Then CPU 55 drives a shutter blade which operates also for a controlled stop. Thus one exposure is taken. If the measured object brightness is equal to or less than a reference brightness level, the exposure calculator circuit 57 sends CPU 55 data adapted to flash photography. The shutter blade is driven according to this data. A flash circuit 58 in the electronic flash unit is caused in synchronism with the movement of the shutter blade to drive the flash emitter 45 for flash emission.

A photo film advancing mechanism 59 drives a spool in the photo film cassette 20 and also a photo film take-up spool in a camera, and advances the photo film 22 from the cassette shell 21, winds the photo film 22 about the take-up spool after being advanced, and after all frames on the photo film 22 are exposed, winds back the photo film 22 into the cassette shell 21.

In the photo film advance immediately after loading of the photo film cassette 20, a magnetic head 60 in an information input unit reads data from a magnetic data track in a leader portion of the photo film 22, the data including photo film speed, the photo film type and the like. The data is sent by a head driver 61 to CPU 55. After each exposure is taken, the magnetic head 60 is driven to record various kinds of data magnetically to a magnetic data track disposed at each of frames. The data to be written includes shutter speed, the use or lack of the use of flash emission, the use or lack of the use of the flash filter 54 in the case of the use of flash emission, the number of prints and the like. The written data is read at the time of printing, and are used for example for checking the number of actually produced prints to optimize the printing operation.

There are RAM/ROM 55a as memory and an EEPROM (electrically erasable programmable read only memory) 62, both connected to CPU 55. ROM in RAM/ROM 55a stores a control program, according to which CPU 55 effects a sequential control of relevant components in the camera. RAM in RAM/ROM 55a is a work memory for temporarily storing data required for the control.

EEPROM 62 stores data of a relationship between the type of the photo film 22 and the use or lack of the use of the flash filter 54. CPU 55 reads the data from EEPROM 62 for determining the use or lack of the use of the flash filter 54 at an address of the type information of the photo film 22 as a result of reading by the magnetic head 60. A filter drive mechanism 63 in the color balance adjustor moves the flash filter 54 to the filtering position or the retracted position according to the determined the use or lack of the use of the flash filter 54. Note that the use of EEPROM 62 which is erasable is advantageous in changes or addition of types of the photo film 22 included in the particular type, specifically when photo films as new products become sold in the market. This is because type data can be added newly to or rewritten in EEPROM 62.

This being so, the compact camera when used with the photo film 22 of the particular type can take exposures at high color reproducibility in the indoor photography, because the flash filter 54 is disposed in front of the protector/diffuser plate 45a and the coloration-revised flash light is set near to light emitted by the white fluorescent lamp in consideration of the reproduced state on the photo film 22.

If the spectral sensitivity of the particular type and the remaining types of the photo film 22 is determined so that an image recorded on the remaining types has greenish coloration in comparison with coloration of that recorded on the particular type, then the flash filter can have a pale green color for flash light to satisfy the condition $\Delta E \leq 0.08$.

It is to be noted that the camera can have a plurality of flash filters with different values of spectral transmittance. The flash filters are selectable according to spectral sensitivity of each of type of photo films. So it is possible to take exposures with high reproducibility of color in the indoor photography.

It is to be noted that, in a manner similar to the above-described lens-fitted photo film unit, a light balancing filter may be inserted to a photographing light path of the compact camera. Even if a printer to be used does not have function to detect the use or lack of the use of flash emission of frames in the single photo film, it is possible to avoid unacceptably reproducing either outdoor frames under daylight or indoor frames in a manner due to influence of either to the remainder.

In the present embodiment, the type information as to which of the particular type or the remaining types is read from the photo film 22 by use of the magnetic head 60 as information input unit. Alternatively, a compact camera may be provided with a type setting button or the like, with which a user can manually input the type information of the photo film 22. The photo film 22, therefore, may be a type without the magnetic data track, for example 135 type.

Sample 3

A sample of the above-constructed compact camera was produced experimentally, and subjected to tests. The photo film 22 was the same as that of Sample 1. Approximately 200 frames were exposed indoors with flash light, and approximately 100 frames were exposed outdoors without flash light. When the flash light was used, plural kinds of information were recorded to the magnetic data track of each of the frames, the information including information of the use or lack of the use of the flash filter 54, information as to flash light of the daylight color or not had been used, and information as to either the directly emitted flash light or the coloration-revised flash light revised by the flash filter 54. At the time of producing a color photographic print, a printer read data from the magnetic data track of each of the frames, and determined a printing condition according to the information as to flash light of the daylight color had been used, and the information as to either the directly emitted flash light or the coloration-revised flash light. As a result, exposures were taken with very high reproducibility of color in the indoor photography without occurrence of color failure.

Digital Still Camera as Embodiment with Image Sensor

Figure 16:
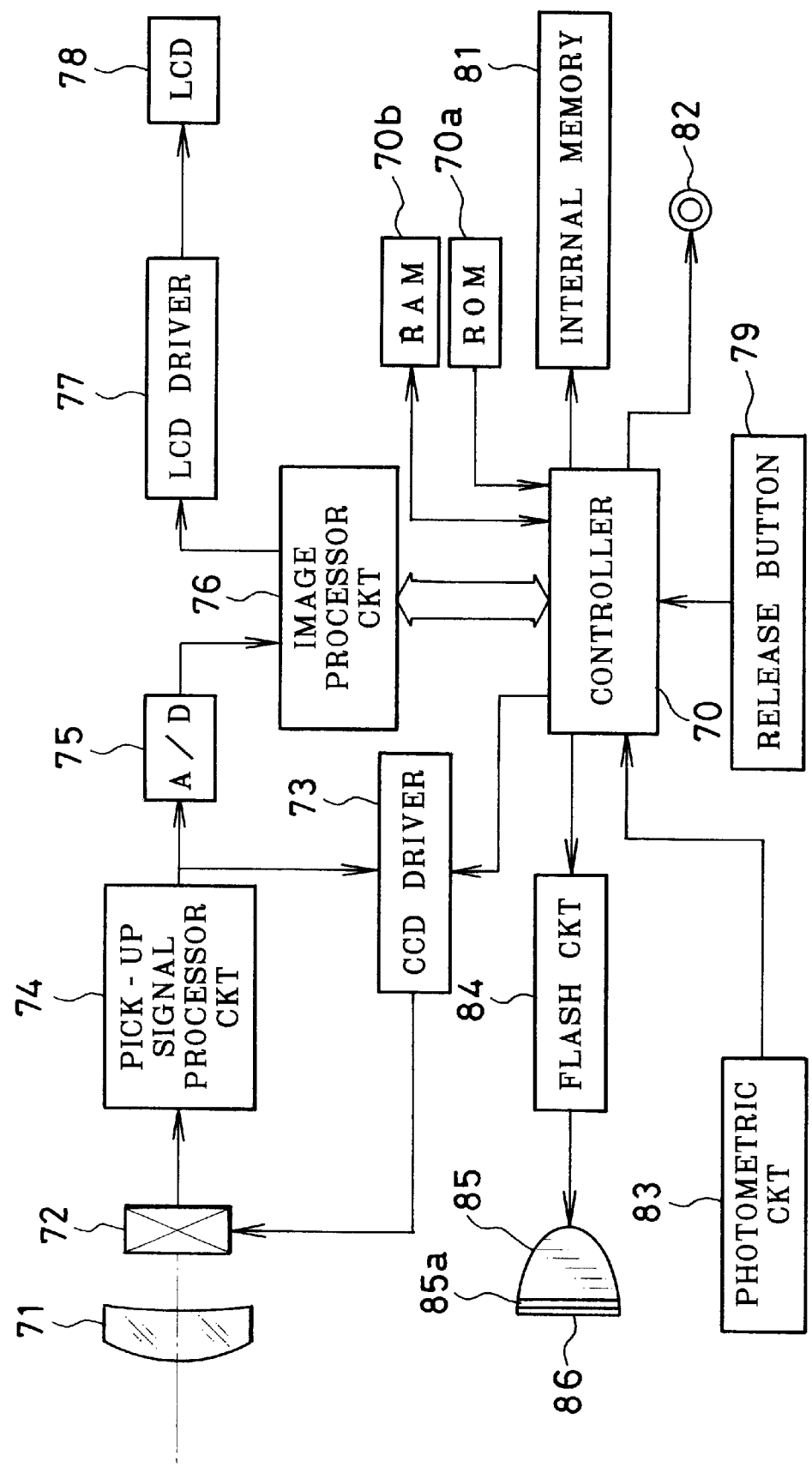
FIG. 16 is a block diagram schematically illustrating a digital still camera of the present invention.

In FIG. 16, a digital still camera with a structure according to the present invention is depicted. A controller 70 as mode selector and color balance adjustor is connected with a ROM 70a and a RAM 70b. ROM 70a stores data and a control program of a sequence required for picking up an image. RAM 70b temporarily stores parameters and the like required for executing the sequence. The controller 70 controls the components in the digital still camera according to the control program in ROM 70a.

A CCD (charge coupled device) image sensor 72 in an exposure station is disposed behind a taking lens 71, which focuses an object image of the photographic object 18 to a pick-up surface of the CCD image sensor 72. A CCD driver 73 drives the CCD image sensor 72, which converts an optical image into an electrical pick-up signal.

A pick-up surface of the CCD image sensor 72 is provided with plural micro color filters in Red (R), Green (G) and Blue (B) colors in a small size arranged in a matrix. A pick-up signal is output by each of the three colors. A pick-up signal processor circuit 74 converts the pick-up signal into a signal of a predetermined signal form, which is converted by an A/D converter 75 digitally into three sets of image data of respectively the Red (R), Green (G) and Blue (B) colors.

An image processor circuit 76 as color balance adjustor subjects the image data to plural steps of image processing such as γ correction and the color correction. At the time of pick-up mode, the image data from the A/D converter 75 is sent to the image processor circuit 76. One-frame image data after the image processing in the image processor circuit 76 is serially sent to a liquid crystal display device (LCD) driver 77. A liquid crystal display device (LCD) 78 is caused by the LCD driver 77 to display the object image as an animation picture. A release button 79 is depressed. The one-frame image data at the time of depression is written by the controller 70 to an internal memory 81 as a recording medium.

The stored image data is read by the controller 70, and sent by the image processor circuit 76 to the LCD driver 77, so that the retrieved image after the pick-up can be viewed by a user as a still image in the LCD 78. The digital still camera also has an output terminal 82, which sends image data to an external printer, which can produce a hard copy of the image.

It is to be noted that the internal memory 81 may be replaced with an externally connectable memory such as a RAM card or a flexible magnetic disk.

In the case of no flash emission, the image processor circuit 76 effects a "flashless normal type of color correction", in which color balance of the image data of each color is corrected in consideration of the spectral sensitivity of the CCD image sensor 72 in the manner of known digital still cameras, to optimize the color balance of the image picked up with illumination of the daylight color. In contrast, in the case of flash emission, the image processor circuit 76 effects a "flashed type of color correction", in which color balance is corrected according to the color of the flash light which will be described later.

Also, characteristics, parameters and like of the CCD image sensor 72 are preset in such a manner that the phase angle or hue angle θ of the coloration of the gray reference reflector plate reproduced while illuminated by the F6 white fluorescent lamp satisfies the condition of $40° \leq \theta \leq 90°$.

A photometric circuit 83 as mode selector measures object brightness. If the object brightness is lower than a reference brightness level, a flash circuit 84 in an electronic flash unit operates upon depression of the release button 79 and causes a flash emitter 85 in the electronic flash unit to emit flash light. A protector plate 85a is mounted on the flash emitter 85. Also a flash filter 86 is mounted on the front of the protector plate 85a, for determining color of the flash light.

Furthermore, the spectral transmittance of the flash filter 86 is preset in such a manner that the distance ΔE satisfies the condition of $\Delta E \leq 0.06$, where the distance ΔE, in the manner described above, is defined between the coloration of the gray reference reflector plate with light from the F6 white fluorescent lamp and the coloration of the same with flash light.

In FIG. 17, image pick-up operation of the digital still camera is depicted. When the release button 79 is depressed, the photometric circuit 83 measures object brightness, to determine the use or lack of the use of flash emission and other exposure conditions. Then the CCD image sensor 72 is driven under the determined exposure conditions, and picks up an image to be retrieved. If the object brightness is lower than the predetermined brightness level, then the flash emitter 85 is caused to emit flash light through the flash filter 86 toward the photographic object 18.

Image data obtained by the pick-up is processed by the image processor circuit 76 for the required image processing, and written by the controller 70 to the internal memory 81. In the case of lack of flash emission, the image data is subjected to the flashless normal type of color correction. In the case of the use of flash emission, the image data is subjected to the flashed type of color correction before being stored in the internal memory 81.

Therefore, the flashless normal type of color correction designated for the outdoor photography under daylight makes it possible to reproduce a principal object in neutral coloration. Also, the flashed type of color correction designated for the indoor photography with flash light makes it possible to reproduce a principal object in neutral coloration or color balance (chromaticity) before image data is stored. The image can be reproduced with high fidelity in the color according to the image data in the internal memory 81, both when the image is displayed on the LCD 78 and when a hard copy is printed by a printer.

It is to be noted that, instead of effecting the color correction of the image data, it is possible to subject a pick-up signal to color correction. Also a digital still camera may be structured to effect color correction only for frames exposed with flash light. For frames exposed with daylight, the still camera can operate for obtaining image data or a pick-up signal of color balance optimized automatically without correction. Alternatively, a digital still camera may have a selector for selectively designating one of the flashless normal type and the flashed type of color correction. Such a selector may operate automatically, or else may be a selector button manually operable by a user. This is effective in optimized color reproduction even for frames of images photographed outdoors with flash light.

Furthermore, a digital still camera may be structured to effect color correction only for frames exposed while illuminated by daylight. For frames exposed while illuminated by flash light, the still camera can operate for obtaining image data or a pick-up signal of color balance optimized automatically without correction.

Sample 4

A sample of the above-constructed digital still camera was produced experimentally, and subjected to tests. Image data was obtained, and sent to a printer, which produced prints. In the printer, all the frames were printed in a common printing algorithm without distinction between the use and lack of the use of flash emission. In Sample 4, approximately 200 frames were exposed indoors with flash light, and approximately 100 frames were exposed outdoors without flash light. As a result, images were photographed with very high reproducibility of color in the indoor and outdoor photography without occurrence of color failure, in an agreeable manner similar to the above samples including the photo film.

In the above embodiments, any of the lens-fitted photo film unit, compact camera and digital still camera has the flashing mode and the flashless mode either of which can be selectively designated. However the structure of the present invention can be used in a lens-fitted photo film unit, a compact camera, a digital still camera and other optical instruments which do not have the flashless mode but in which flash light is emitted for every frame. Images may be recorded always with color balance near to virtual color balance of a photographic object recorded after exposure under illumination of a white fluorescent lamp.

For example, a lens-fitted photo film unit or a compact camera may be provided with a stationary light balancing filter, disposed crosswise to a photographing light path, for changing object light to color-balance-revised object light with color near to that of object light from an object virtually illuminated by the white fluorescent lamp.

Also, a lens-fitted photo film unit or a compact camera may be provided with a stationary flash filter, disposed fixedly at the flash emitter, for changing flash light to coloration-revised flash light with color near to that of light of the white fluorescent lamp. A digital still camera may have the image processor circuit for revising image data of an image to data representing an image with color near to that of the image photographed virtually under illumination of the white fluorescent lamp.

In the above embodiments, the F6 type of white fluorescent lamp is used as reference light source of which coloration is used as reference to that of the flash unit. But any type of white fluorescent lamp may be used as reference light source, for example a cool white or warm white fluorescent lamp. Furthermore, a fluorescent lamp of light source color being not white may be used.

In the above lens-fitted photo film unit or compact camera, the color negative photo film is used. However a color reversal photo film may be used instead.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An optical instrument for photographing an object, comprising an electronic flash unit for applying flash light to said object, a taking lens for directing object light from said object to an exposure station to form a color image, wherein recording medium photographically, electrically or magnetically records said color image photographed in said exposure station;

said optical instrument satisfying a condition of:

$$0 \leq \Delta E \leq 0.08$$

where $\Delta E$ is a light source color difference amount between said flash unit and a white fluorescent lamp of F6 type, and obtained from a condition of:

$$\Delta E = \sqrt{[(X_1-X_2)^2+(Y_1-Y_2)^2]}$$

where $X_1$, $Y_1$, $X_2$ and $Y_2$ are obtained from conditions of:

$$X_1=[(RF-R0)-(GF-G0)]-[(BF-B0)-(GF-G0)]/2$$

$$Y_1=[(BF-B0)-(GF-G0)]\times\sin(\pi/3)$$

$$X_2=[(RS-R0)-(GS-G0)]-[(BS-B0)-(GS-G0)]/2$$

$$Y_2=[(BS-B0)-(GS-G0)]\times\sin(\pi/3)$$

where RF, GF and BF are Status-M converted density of red, green and blue colors of a gray reference reflector plate having a reflectance factor of 18%, said Status-M converted density being obtained by illuminating said gray reflector plate with said white fluorescent lamp of said F6 type, and by photographing an image of said gray reflector plate in said exposure station;

RS, GS and BS are Status-M converted density of said red, green and blue colors of said gray reflector plate, said Status-M converted density being obtained by illuminating said gray reflector plate with said flash unit, and by photographing an image of said gray reflector plate in said exposure station;

R0, G0 and B0 are Status-M converted density of said red, green and blue colors of said gray reflector plate, said Status-M converted density being obtained by illuminating said gray reflector plate with a standard light source C, and by photographing an image of said gray reflector plate in said exposure station.

2. An optical instrument as defined in claim 1, said optical instrument satisfying a condition of:

$$0 \leq \Delta E \leq 0.06.$$

3. An optical instrument as defined in claim 1, said optical instrument satisfying a condition of:

$0 \leq \Delta E \leq 0.04$.

4. An optical instrument as defined in claim 1, further comprising:
   a mode selector for designating a selected one of first and second photographing modes of photographing with flash light and photographing without said flash light;
   a color balance adjustor for subjecting said flash light or said object light to correction of color balance thereof if said first photographing mode is designated, to satisfy said condition of:

$0 \leq \Delta E \leq 0.08$ so as to set color balance substantially equal between recorded images photographed in said first and second photographing modes.

5. An optical instrument as defined in claim 4, said optical instrument has a phase angle θ satisfying a condition of:

$40° \leq \theta \leq 90°$ where said phase angle θ depends upon RF, GF, BF, R0, G0 and B0 and is defined in an X-Y orthogonal coordinate system between a vector $(X_1, Y_1)$ and a portion of X-axis having a positive sign in a predetermined rotational direction according to a point $(X_1, Y_1)$ plotted in said X-Y orthogonal coordinate system.

6. An optical instrument as defined in claim 5, wherein said phase angle θ is a value satisfying conditions of:
   if $X_1=0$ and $Y_1=0$, then $\theta=0°$,
   if $X_1 \neq 0$, then $\theta=\tan^{-1}(Y_1/X_1)$,
   if $X_1>0$, $Y_1 \geq 0$, then $0° \leq \tan^{-1}(Y_1/X_1) \leq 90°$,
   if $X_1<0$, $Y_1 \geq 0$, then $90° \leq \tan^{-1}(Y_1/X_1) \leq 180°$,
   if $X_1<0$, $Y_1 \leq 0$, then $180° \leq \tan^{-1}(Y_1/X_1) \leq 270°$,
   if $X_1>0$, $Y_1 \leq 0$, then $270° \leq \tan^{-1}(Y_1/X_1) \leq 360°$.

7. An optical instrument as defined in claim 6, wherein said recording medium is an unexposed photo film set in said exposure station, and having spectral sensitivity satisfying said condition of:

$40° \leq \theta \leq 90°$ so as to record a light source color of said white fluorescent lamp of said F6 type in a manner tinted with a yellow, reddish yellow or greenish yellow color in comparison with a light source color of said standard light source C.

8. An optical instrument as defined in claim 4, wherein said second photographing mode is photographing with said flash light, and said mode selector allows actuation of said flash unit if said second photographing mode is designated.

9. An optical instrument as defined in claim 8, wherein said color balance adjustor comprises a light balancing filter, and if said first photographing mode is designated, is positioned in front of said exposure station, and if said second photographing mode is designated, is positioned away from a front of said exposure station.

10. An optical instrument as defined in claim 9, wherein said optical instrument is a lens-fitted photo film unit preloaded with unexposed photo film in said exposure station.

11. An optical instrument as defined in claim 8, wherein said optical instrument is a digital still camera;
    further comprising an image sensor, disposed in said exposure station for outputting image information by converting object light into an electric signal;
    said color balance adjustor is an image processor for correcting said image information from said image sensor if said second photographing mode is designated.

12. An optical instrument as defined in claim 10, wherein said mode selector includes:
    a photometric circuit for measuring object brightness of said object light; and
    a controller for comparing said object brightness with reference brightness, to designate said second photographing mode if said object brightness is equal to or less than said reference brightness, and to designate said first photographing mode if said object brightness is more than said reference brightness.

13. An optical instrument as defined in claim 1, wherein said optical instrument is a camera, and is loadable with said recording medium, and said recording medium is photo film of first and second types, said photo film is set in said exposure station;
    further comprising:
    a mode selector for designating first and second photographing modes for respectively said first and second types, said light source color difference amount ΔE satisfying said condition when said first photographing mode is designated;
    a color balance adjustor for correcting color balance of said flash light directly emitted by said flash unit in accordance with spectral sensitivity of said first and second types and coloration of said flash light, so as to set color balance substantially equal between recorded images photographed in said first and second types irrespective of a difference between said first and second types in said spectral sensitivity.

14. An optical instrument as defined in claim 13, wherein said color balance adjustor comprises a flash filter, and if said first photographing mode is designated, is set away from a front of a flash emitter of said flash unit, and if said second photographing mode is designated, is set in front of said flash emitter.

15. An image photographing method for photographing an object, comprising steps of:
    applying flash light to said object when an electronic flash unit is allowed to operate;
    forming a color image in an exposure station by passing object light from said object through a taking lens;
    recording said color image photographically, electrically or magnetically to recording medium by photographing said color image in said exposure station;
    said image photographing method satisfying a condition of:

$0 \leq \Delta E \leq 0.08$ where ΔE is a light source color difference amount between said flash unit and a white fluorescent lamp of F6 type, and obtained from a condition of:

$\Delta E = \sqrt{[(X_1-X_2)^2+(Y_1-Y_2)^2]}$ where $X_1, Y_1, X_2$ and $Y_2$ are obtained from conditions of:

$X_1=[(RF-R0)-(GF-G0)]-[(BF-B0)-(GF-G0)]/2$ $Y_1=[(BF-B0)-(GF-G0)] \times \sin(\pi/3)$ $X_2=[(RS-R0)-(GS-G0)]-[(BS-B0)-(GS-G0)]/2$ $$Y_2 = [(BS-B0)-(GS-G0)] \times \sin(\pi/3)$$

where RF, GF and BF are Status-M converted density of red, green and blue colors of a gray reference reflector plate having a reflectance factor of 18%, said Status-M converted density being obtained by illuminating said gray reflector plate with said white fluorescent lamp of said F6 type, and by photographing an image of said gray reflector plate in said exposure station;

RS, GS and BS are Status-M converted density of said red, green and blue colors of said gray reflector plate, said Status-M converted density being obtained by illuminating said gray reflector plate with said flash unit, and by photographing an image of said gray reflector plate in said exposure station;

R0, G0 and B0 are Status-M converted density of said red, green and blue colors of said gray reflector plate, said Status-M converted density being obtained by illuminating said gray reflector plate with a standard light source C, and by photographing an image of said gray reflector plate in said exposure station.

16. An image photographing method as defined in claim 15, further comprising steps of:

designating a selected one of first and second photographing modes of photographing in conditions different from one another;

if said first photographing mode is designated, subjecting said flash light or said object light to correction of color balance thereof to satisfy said condition of:

$$0 \leq \Delta E \leq 0.08$$

so as to set color balance substantially equal between recorded images photographed in said first and second photographing modes.

17. An image photographing method as defined in claim 16, wherein said first and second photographing modes are a flashless mode and a flashing mode, and said flash unit is allowed to operate if said flashing mode is designated.

18. An image photographing method as defined in claim 15, wherein said image recording step includes outputting image information by converting said color image into an electric signal;

further comprising steps of:

designating a selected one of first and second photographing modes of photographing in conditions different from one another;

if said first photographing mode is designated, correcting said image information to satisfy said condition of:

$$0 \leq \Delta E \leq 0.08$$

so as to set color balance substantially equal between recorded images photographed in said first and second photographing modes.

19. An image photographing method as defined in claim 15, wherein said image photographing method is usable with photo film of first and second types, and said photo film is set in said exposure station;

further comprising steps of:

if said photo film is said first and second types, designating respectively said first and second photographing modes, said light source color difference amount ΔE satisfying said condition when said first photographing mode is designated;

correcting color balance of said flash light directly emitted by said flash unit in accordance with spectral sensitivity of said first and second types and coloration of said flash light, so as to set color balance substantially equal between recorded images photographed in said first and second types irrespective of a difference between said first and second types in said spectral sensitivity.

* * * * *